US012391043B2

(12) United States Patent
Kawakami et al.

(10) Patent No.: US 12,391,043 B2
(45) Date of Patent: Aug. 19, 2025

(54) LIQUID DISCHARGE HEAD, LIQUID DISCHARGE DEVICE, LIQUID DISCHARGE APPARATUS, AND METHOD OF MANUFACTURING LIQUID DISCHARGE HEAD

(71) Applicants: Sho Kawakami, Kanagawa (JP); Jun Zhang, Kanagawa (JP); Yasunori Sugimoto, Kanagawa (JP); Toshihiro Kanematsu, Kanagawa (JP); Mizuki Otagiri, Kanagawa (JP); Riku Maeshiro, Kanagawa (JP); Kiyoshi Amari, Kanagawa (JP)

(72) Inventors: Sho Kawakami, Kanagawa (JP); Jun Zhang, Kanagawa (JP); Yasunori Sugimoto, Kanagawa (JP); Toshihiro Kanematsu, Kanagawa (JP); Mizuki Otagiri, Kanagawa (JP); Riku Maeshiro, Kanagawa (JP); Kiyoshi Amari, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 204 days.

(21) Appl. No.: 18/197,744

(22) Filed: May 16, 2023

(65) Prior Publication Data

US 2023/0373214 A1 Nov. 23, 2023

(30) Foreign Application Priority Data

May 20, 2022 (JP) ................................. 2022-083024
Mar. 14, 2023 (JP) ................................. 2023-039858

(51) Int. Cl.

| | |
|---|---|
| ***B41J 2/14*** | (2006.01) |
| ***B41J 2/16*** | (2006.01) |
| ***B41J 2/175*** | (2006.01) |
| *B41J 25/00* | (2006.01) |

(52) U.S. Cl.
CPC ............. *B41J 2/1433* (2013.01); *B41J 2/162* (2013.01); *B41J 2/1623* (2013.01);
(Continued)

(58) Field of Classification Search
CPC ........ B41J 2/1433; B41J 2/162; B41J 2/1623; B41J 2/17596
See application file for complete search history.

(56) References Cited

U.S. PATENT DOCUMENTS

2004/0104954 A1* 6/2004 Ito ........................ B41J 2/14209 347/20
2004/0263570 A1* 12/2004 Chikamoto ............ B41J 2/1623 347/49

(Continued)

FOREIGN PATENT DOCUMENTS

JP 9-123461 5/1997
JP 10-119259 5/1998

(Continued)

OTHER PUBLICATIONS

Extended European Search Report issued Sep. 12, 2023 in European Patent Application No. 23173432.8, 8 pages.

*Primary Examiner* — Jason S Uhlenhake
(74) *Attorney, Agent, or Firm* — XSENSUS LLP

(57) ABSTRACT

A liquid discharge head includes a nozzle plate, a housing, a channel, and a positioning member. The nozzle plate has a nozzle hole and a first positioning hole penetrating through the nozzle plate in a thickness direction of the nozzle plate. The housing is bonded to the nozzle plate to form a single bonded body and has a second positioning hole extending in a thickness direction of the housing. A liquid flows through the channel between the nozzle plate and the housing to the nozzle hole. The positioning member fits into the first positioning hole and the second positioning hole to position the nozzle plate relative to the housing. A length of the (Continued)

positioning member is smaller than a sum of a length of the first positioning hole and a length of the second positioning hole in the thickness direction of the nozzle plate, and larger than the length of the second positioning hole.

16 Claims, 12 Drawing Sheets

(52) U.S. Cl.
CPC .. *B41J 2/17596* (2013.01); *B41J 2002/14475* (2013.01); *B41J 25/001* (2013.01); *B41J 2202/05* (2013.01)

(56) References Cited

U.S. PATENT DOCUMENTS

| | | | | |
|---|---|---|---|---|
| 2007/0195130 | A1* | 8/2007 | Koda | B41J 2/1632 347/68 |
| 2011/0221822 | A1* | 9/2011 | Hagiwara | B41J 2/155 347/44 |
| 2019/0217614 | A1 | 7/2019 | Tadashi et al. | |
| 2020/0324312 | A1 | 10/2020 | Tadashi et al. | |
| 2022/0184967 | A1 | 6/2022 | Hiraga | |
| 2022/0379609 | A1 | 12/2022 | Matsufuji et al. | |

FOREIGN PATENT DOCUMENTS

| | | |
|---|---|---|
| JP | 2007-030429 | 2/2007 |
| JP | 2007-055046 | 3/2007 |
| JP | 2007-216633 | 8/2007 |
| JP | 2010-173158 | 8/2010 |
| JP | 2013-039507 | 2/2013 |
| JP | 2021-151767 | 9/2021 |
| WO | 2021/191728 A1 | 9/2021 |

* cited by examiner

COMPARATIVE EXAMPLE

COMPARATIVE EXAMPLE

COMPARATIVE EXAMPLE

FIG. 14

| | STRUCTURE OF LAMINATED PLATE | * CONCENTRICITY |
|---|---|---|
| EMBODIMENT 1 | SINGLE BONDED BODY: 1 NOZZLE PLATE<br>POSITIONING HOLES AT BOTH ENDS:<br>ROUND HOLE WITH DIAMETER OF 1.01 mm; AND<br>ROUND HOLE WITH DIAMETER OF 1.05 mm | ACCEPTABLE |
| EMBODIMENT 2 | SINGLE BONDED BODY: 2 NOZZLE PLATES<br>POSITIONING HOLES AT BOTH ENDS:<br>ROUND HOLE WITH DIAMETER OF 1.01 mm; AND<br>ROUND HOLE WITH DIAMETER OF 1.05 mm | ACCEPTABLE |
| EMBODIMENT 3 | SINGLE BONDED BODY: 1 NOZZLE PLATE<br>POSITIONING HOLES AT BOTH ENDS:<br>ROUND HOLE WITH DIAMETER OF 1.01 mm; AND<br>SLOTTED HOLE WITH DIAMETER OF 1.01 × 1.05 mm | GOOD |
| EMBODIMENT 4 | SINGLE BONDED BODY: 1 NOZZLE PLATE<br>THREE POSITIONING HOLES:<br>ROUND HOLE WITH DIAMETER OF 1.01 mm AT CENTER; AND<br>SLOTTED HOLES WITH DIAMETER OF 1.01 × 1.05 mm AT BOTH ENDS | GOOD |
| COMPARATIVE EXAMPLE 1 | SINGLE BONDED BODY SAME AS EMBODIMENT 1<br>COMPARATIVE METHOD:<br>POSITIONING → REMOVING POSITIONING PIN → DIFFUSION BONDING | POOR |
| COMPARATIVE EXAMPLE 2 | SINGLE BONDED BODY SAME AS EMBODIMENT 1<br>COMPARATIVE METHOD:<br>POSITIONING → TEMPORARY FIXING → REMOVING POSITIONING PIN → DIFFUSION BONDING | – |

* DEVIATION BETWEEN THROUGH HOLE AND NOZZLE HOLE
GOOD: LESS THAN OR EQUAL TO 15 μm
ACCEPTABLE: GREATER THAN 15 μm AND LESS THAN OR EQUAL TO 25 μm
POOR: GREATER THAN 25 μm
–: DEFECTIVE BONDING

LIQUID DISCHARGE HEAD, LIQUID DISCHARGE DEVICE, LIQUID DISCHARGE APPARATUS, AND METHOD OF MANUFACTURING LIQUID DISCHARGE HEAD

CROSS-REFERENCE TO RELATED APPLICATIONS

This patent application is based on and claims priority pursuant to 35 U.S.C. § 119(a) to Japanese Patent Application Nos. 2022-083024, filed on May 20, 2022, and 2023-039858, filed on Mar. 14, 2023, in the Japan Patent Office, the entire disclosure of each of which is hereby incorporated by reference herein.

BACKGROUND

Technical Field

Embodiments of the present disclosure relate to a liquid discharge head, a liquid discharge device, a liquid discharge apparatus, and a method of manufacturing a liquid discharge head.

Related Art

In the related art, a liquid discharge apparatus includes a nozzle plate and a needle valve. The nozzle plate has a nozzle hole which is a fine hole. The needle valve has a valve body at a leading end thereof. The valve body of the needle valve contacts and moves away from the nozzle hole to discharge droplets of a highly pressurized liquid of several hundred kPa from the nozzle hole. A trailing end of the needle valve is coupled to a driver (actuator) such as a piezoelectric element. Such a liquid discharge apparatus is used in various fields, for example, to draw a figure on a body of an automobile with high image quality, to discharge droplets of a liquid resist or a DNA sample, or to discharge a constant amount of oil to a mechanical component.

SUMMARY

Embodiments of the present disclosure describe an improved liquid discharge head that includes a nozzle plate, a housing, a channel, and a positioning member. The nozzle plate has a nozzle hole from which a liquid is discharged and a first positioning hole penetrating through the nozzle plate in a thickness direction of the nozzle plate. The housing is bonded to the nozzle plate to form a single bonded body and has a second positioning hole extending in a thickness direction of the housing. The channel is disposed between the nozzle plate and the housing. The liquid flows through the channel to the nozzle hole. The positioning member fits into the first positioning hole and the second positioning hole to position the nozzle plate relative to the housing. A length of the positioning member in the thickness direction of the nozzle plate is smaller than a sum of a length of the first positioning hole and a length of the second positioning hole in the thickness direction of the nozzle plate, and larger than the length of the second positioning hole in the thickness direction of the nozzle plate.

According to another embodiment of the present disclosure, there is provided a method of manufacturing a liquid discharge head. The method includes forming a nozzle hole in a nozzle plate, forming a first positioning hole in the nozzle plate, forming a second positioning hole in a housing, fitting a positioning member into the first positioning hole and the second positioning hole to position the nozzle plate relative to the housing, and bonding the nozzle plate and the housing to each other to form a single bonded body. The first positioning hole penetrates through the nozzle plate in a thickness direction of the nozzle plate, and the second positioning hole extends in a thickness direction of the housing. A length of the positioning member in the thickness direction of the nozzle plate is smaller than a sum of a length of the first positioning hole and a length of the second positioning hole in the thickness direction of the nozzle plate, and larger than the length of the second positioning hole in the thickness direction of the nozzle plate.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 14 is a table illustrating a relation between a structure of the laminated plate and concentricity according to Embodiments 1 to 4 and Comparative Examples 1 and 2:

Figure 1A:
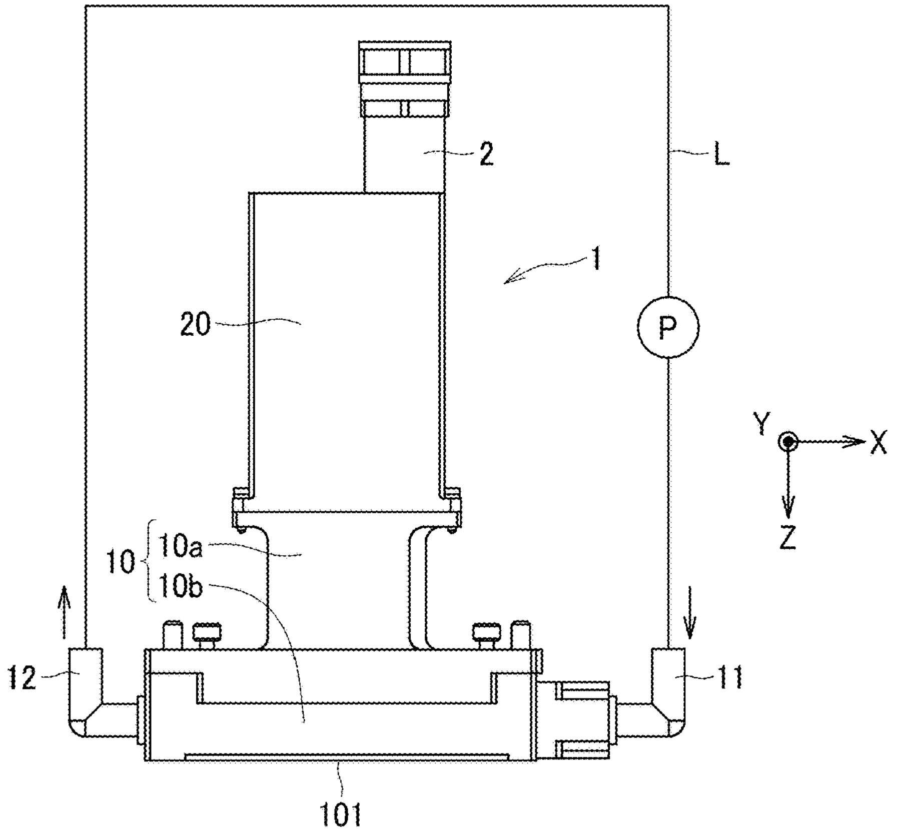
FIG. 1A is a front view of a liquid discharge head according to embodiments of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Liquid Discharge Head

Figure 1B:
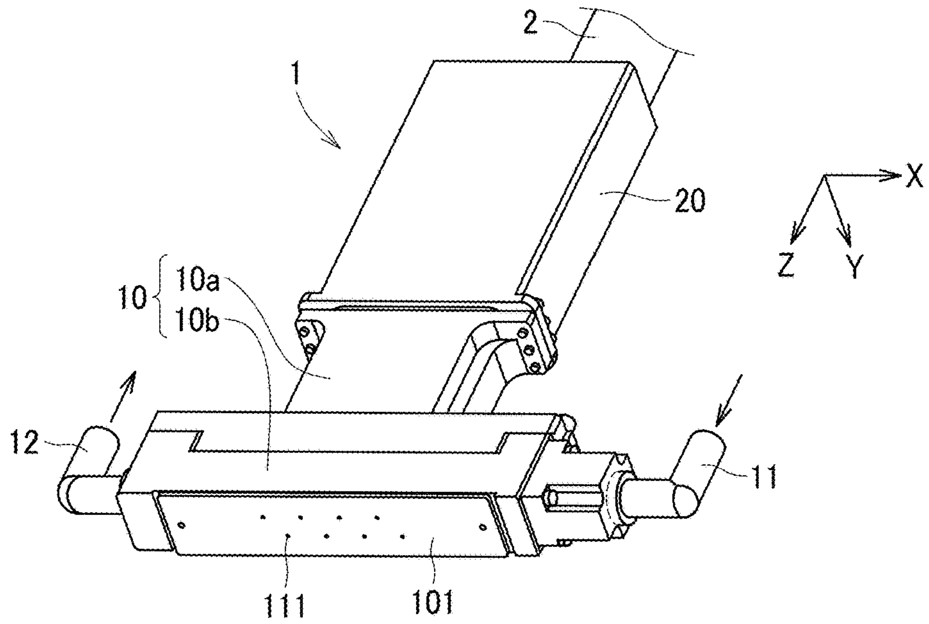
FIG. 1B is a perspective view of the liquid discharge head according to embodiments of the present disclosure.

Embodiments of the present disclosure are described below with reference to the accompanying drawings. FIG. 1A is a front view of a liquid discharge head 1, and FIG. 1B is a perspective view of the liquid discharge head 1 as viewed obliquely from below. Coordinate axes of an X-axis, a Y-axis, and a Z-axis illustrated in FIGS. 1A and 1B indicate the same directions as the coordinate axes in the other drawings below.

The liquid discharge head 1 includes a housing 10 including an upper housing 10*a* and a lower housing 10*b*. The upper housing 10*a* and the lower housing 10*b* may be formed in a single body. A laminated plate, in which a plurality of plates is laminated one on another, are bonded to each other by diffusion bonding to construct the housing 10 in a single bonded body.

The housing 10 has dimensions of, for example, 80 mm in length (X-axis direction)×25 mm in width (Y-axis direction)×15 mm in thickness (Z-axis direction). Examples of a material of the housing 10 include stainless steel such as steel use stainless (SUS) 430.

A cover 20 is attached onto the upper housing 10*a*, and electrical components are disposed inside the cover 20. A connector 2 connected to the electrical components is disposed at an upper end of the cover 20.

A nozzle plate 101 is disposed on a lower face of the lower housing 10*b*. The nozzle plate 101 is made of a corrosion-resistant material such as SUS430 (i.e., stainless steel), for example. The lower face of the lower housing 10*b* has a surface roughness Ra of 0.01 μm or less. The nozzle plate 101 is bonded to the lower face of the lower housing 10*b* so that the housing 10 supports the nozzle plate 101.

Droplets of liquid are discharged from nozzle holes 111 which are fine holes formed in the nozzle plate 101. Hereinafter, the housing 10 and the nozzle plate 101 are collectively referred to as the laminated plate.

A second nozzle plate may be interposed between the lower housing 10*b* and the nozzle plate 101. Such a configuration increases a bonding strength around a positioning pin 140 (see FIG. 5A) to reinforce the nozzle plate 101, thereby reducing concentricity. That is, a nozzle plate may include a plurality of plates laminated one on another. In addition, a length of the nozzle hole 111 can be extended to enhance a flying stability of the droplets of the liquid discharged from the nozzle holes 111.

Figure 3:
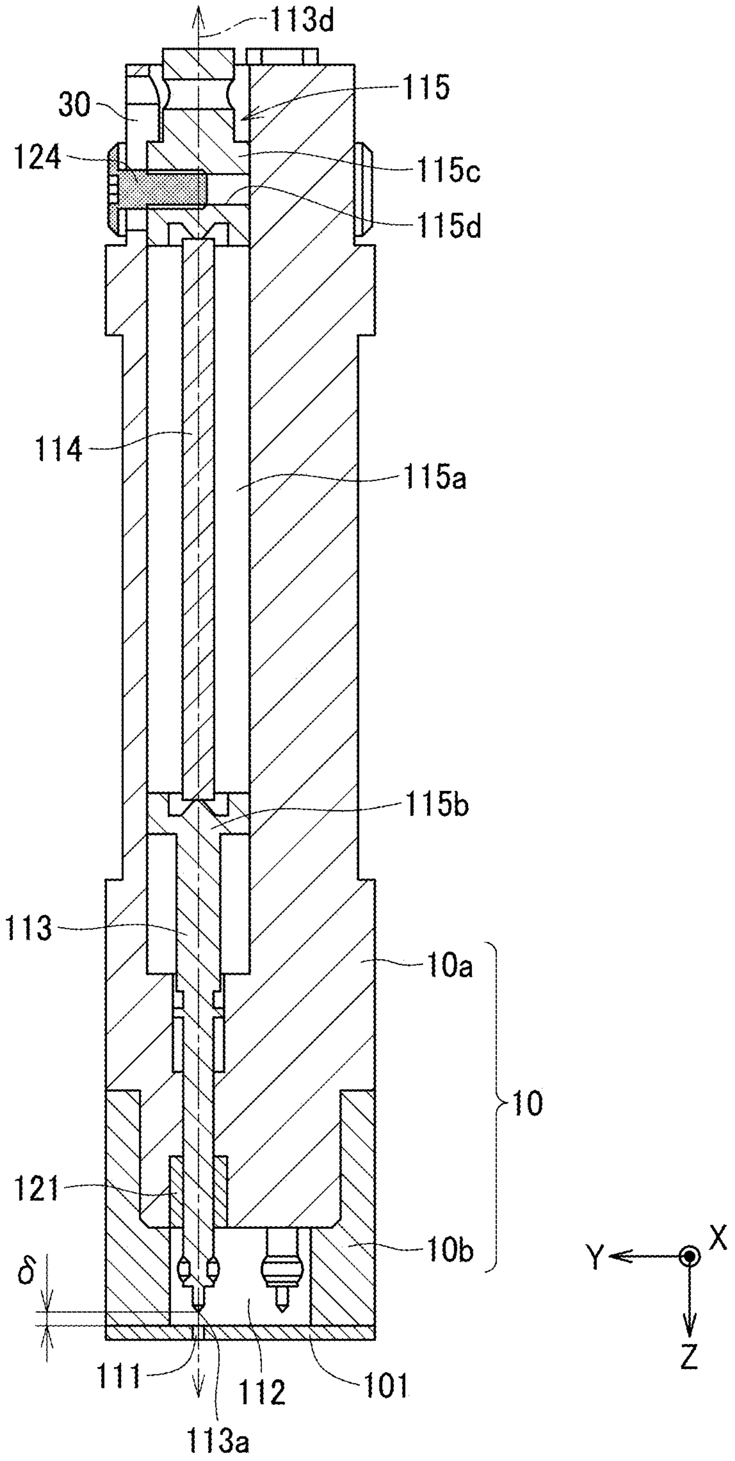
FIG. 3 is a cross-sectional view of the liquid discharge head traversing a channel of the liquid discharge head.
Figure 4A:
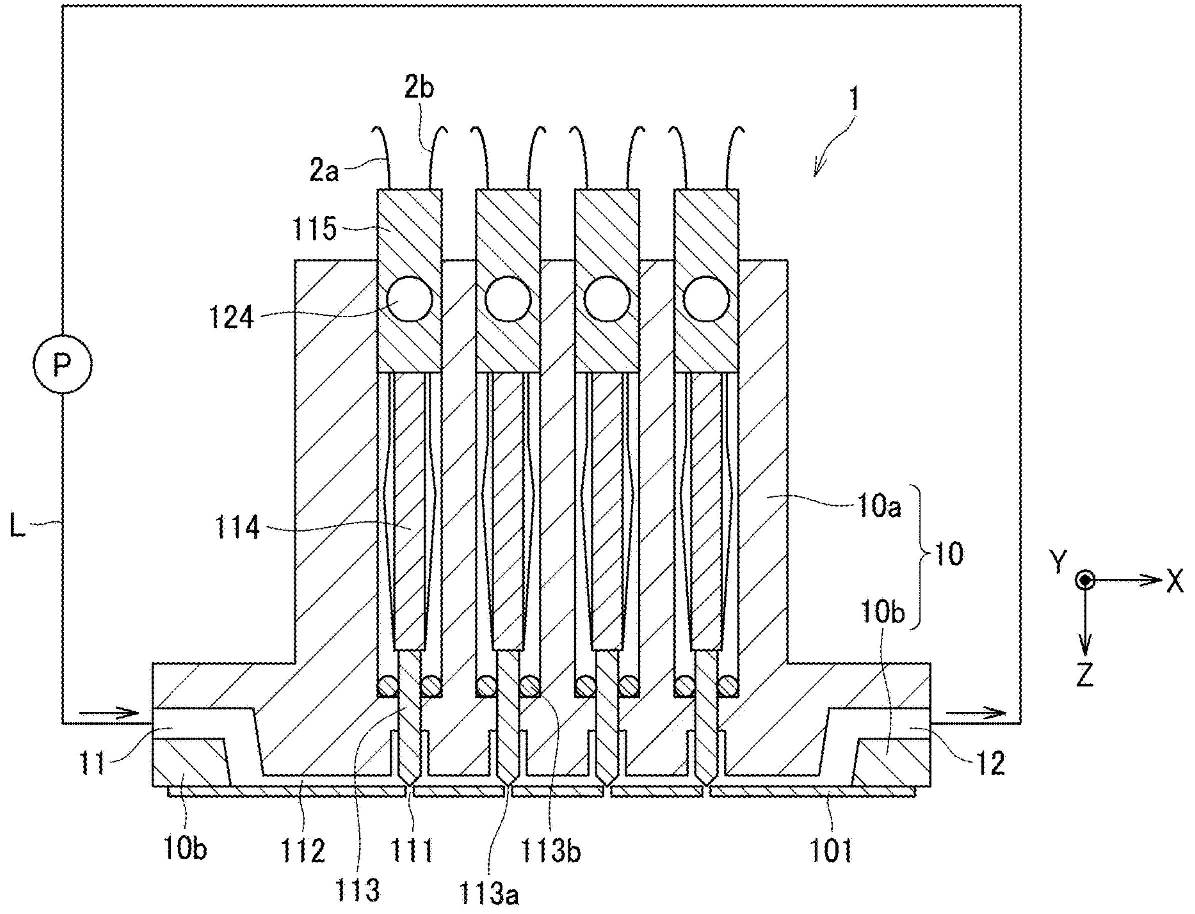
FIG. 4A is a cross-sectional view of the liquid discharge head taken along the channel.
Figure 4B:
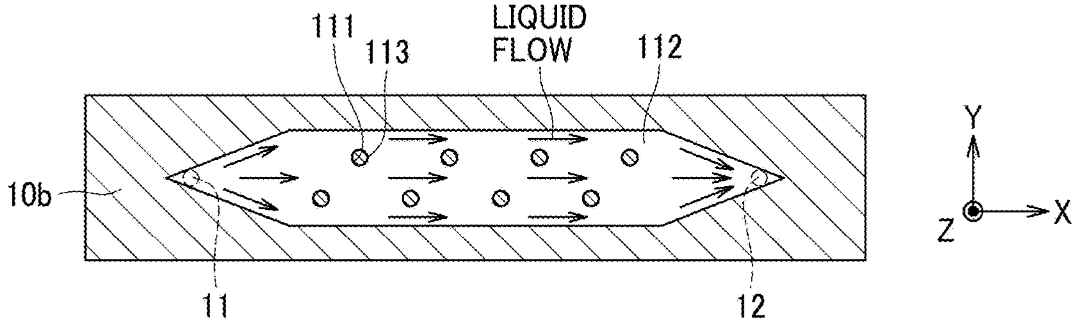
FIG. 4B is a plan view of the lower end of the liquid discharge head in a horizontal cross section.

As illustrated in FIG. 3, a channel 112 of the liquid is formed between the nozzle plate 101 and the housing 10, inside the lower housing 10*b*. One end of the channel 112 communicates with a supply port 11, and the other end of the channel 112 communicates with a collection port 12 as illustrated in FIGS. 4A and 4B.

The supply port 11 and the collection port 12 are connected to each other via a circulation passage L, and the liquid pressurized by a pump P in the circulation passage L is supplied to the supply port 11. The pressurized liquid that has not been discharged from the nozzle holes 111 is collected from the collection port 12, and is then supplied to the supply port 11 again via the circulation passage L and the pump P.

In the liquid discharge head 1 according to the present embodiment, a peripheral portion of the nozzle plate 101 and the housing 10 are firmly bonded to each other, for example, by an adhesive to supply the liquid to the supply port 11 with a feed pressure of several hundred kPa.

Figure 2A:
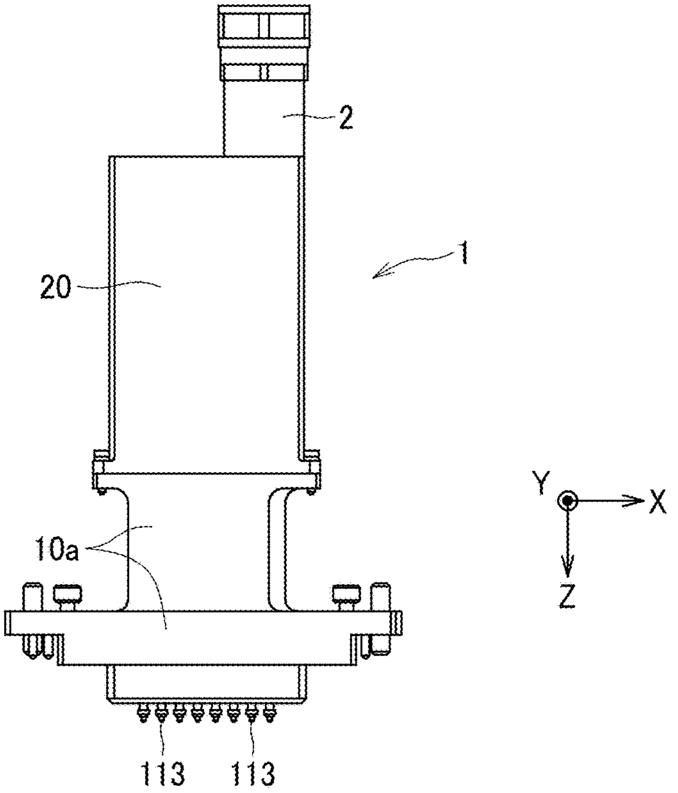
FIG. 2A is a front view of the liquid discharge head from which a lower housing is removed.
Figure 2B:
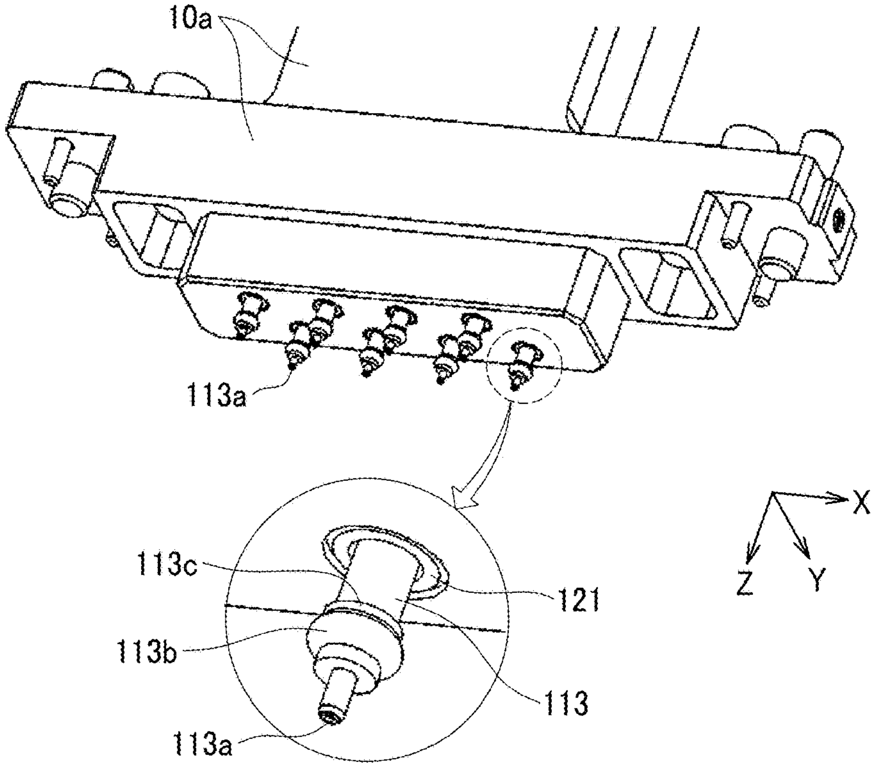
FIG. 2B is an enlarged perspective view of a lower end of the liquid discharge head.

When the lower housing 10*b* is removed, as illustrated in FIGS. 2A and 2B, leading ends of needle valves 113 having a shaft shape are exposed from bearings 121 on a lower face of the upper housing 10*a*. The needle valves 113 are made of the corrosion-resistant material such as SUS (i.e., stainless steel). Each of the needle valves 113 is thin and has a diameter of 1 mm or less at a thin portion and a diameter of about 2 mm at a thick portion. The thin needle valves 113 are exposed from the bearings 121 on the upper housing 10*a* by a length of 1 to 20 mm, for example.

The needle valve 113 includes a valve body 113*a* to open and close the nozzle hole 111 at the leading end of thereof. An O-ring 113*b* having elasticity as a seal and a washer 113*c* to secure the O-ring 113*b* to the needle valve 113 are disposed on a side (upper side in FIG. 2B) of the valve body 113*a* in −Z direction in FIG. 2B. The peripheral portion of the nozzle plate 101 may be bonded to the housing 10 by a thermosetting resin or the like.

The nozzle holes 111 of the nozzle plate 101 are typically formed in one row. Currently, the nozzle holes may be formed in a plurality of rows such as two rows, or three rows or more in order to enhance image quality and downsize the liquid discharge head 1. The nozzle holes 111 arranged in the plurality of rows in a staggered manner can achieve high image quality, downsize the liquid discharge head 1, and increase coating area to enhance productivity without inclining the nozzle plate 101 with respect to a printing direction.

Opening and Closing Operations of Needle Valve

As illustrated in FIG. 3, the needle valve 113 and a piezoelectric element 114 that drives the needle valve 113 are disposed in an axial direction 113*d* of the needle valve 113 in the upper housing 10*a*. The piezoelectric element 114 is held in a central space 115*a* of a holder 115. The axial direction 113*d* of the needle valve 113 corresponds to a height direction (direction parallel to the Z-axis) of the liquid discharge head 1, a longitudinal direction of the piezoelectric element 114, and a direction in which the needle valve 13 moves to open and close the nozzle hole 111.

Spring portions are disposed at both ends (upper and lower end in FIG. 3) of the holder 115, and the piezoelectric element 114 is held in a compressed state in the axial direction 113*d* of the needle valve 113 by the spring portions. A front end 115*b* of the holder 115 and a trailing end of the needle valve 113 are coupled to each other so that the piezoelectric element 114 and the needle valve 113 are concentric (coaxial) with each other. With this configuration, when the piezoelectric element 114 contracts in the longitudinal direction, which is the axial direction 113*d*, the holder 115 also contracts in the longitudinal direction, and a biasing force in a direction (−Z direction) in which the needle valve 113 moves away from the nozzle hole 111 in the axial direction 113*d* acts on the needle valve 113. The direction in which the needle valve 113 moves away from the nozzle hole 111 may be referred to as a direction in which the nozzle hole 111 is opened, and both directions indicate the same direction (i.e., −Z direction illustrated in FIG. 3).

When a voltage is applied to the piezoelectric element 114 by a voltage application unit, the piezoelectric element 114 is operated in a d31 mode to drive the needle valve 113 in the direction (−Z direction) in which the nozzle hole 111 is opened. In the d31 mode, the piezoelectric element 114 contracts when the voltage is applied. That is, the needle valve 113 is driven (moved) in the direction (−Z direction) in which the nozzle hole 111 is opened by the voltage applied to the piezoelectric element 114.

The needle valve 113 closes the nozzle hole 111 when no voltage is applied to the piezoelectric element 114. Thus, even when the pressurized liquid is supplied to the channel 112, the liquid is not discharged from the nozzle hole 111.

The voltage is applied to the piezoelectric element 114 to cause the piezoelectric element 114 to contract, thereby pulling the needle valve 113 via the holder 115. As a result, the valve body 113*a* of the needle valve 113 is moved away from the nozzle hole 111 to open the nozzle hole 111. Accordingly, the pressurized liquid supplied to the channel 112 is discharged from the nozzle hole 111 as droplets of the liquid.

The piezoelectric element 114 may be operated in a d33 mode. In the d33 mode, the piezoelectric element 114 expands in a direction (+Z direction) in which the needle valve 113 is moved toward the nozzle hole 111 in the axial direction 113*d* when the voltage is applied, that is, in a direction in which the nozzle hole 111 is closed. When the piezoelectric element 114 is operated in the d33 mode, the valve body 113*a* of the needle valve 113 is pressed against the nozzle hole 111 to close the nozzle hole 111 while the voltage is applied.

When the droplets of the liquid are discharged, the application of the voltage to the piezoelectric element 114 is stopped or the voltage is lowered to move the valve body 113*a* of the needle valve 113 in the direction (−Z direction) in which the nozzle hole 111 is opened to open the nozzle hole 111. In the d33 mode, the piezoelectric element 114 has a high responsiveness and a large displacement amount. Accordingly, the d33 mode is suitable to increase the responsiveness of opening and closing operations of the needle valve 113 and reduce variations in a speed and a volume of the droplets of the liquid discharged from the nozzle hole 111.

Movement of Needle Valve

The holder 115 is disposed in the upper housing 10*a*, and a position of the holder 115 is adjustable in the top and bottom direction in FIG. 3. A rear end 115*c* of the holder 115 is positioned and secured to the upper housing 10*a* by a fixing screw 124. A female screw hole 115*d* is disposed in the rear end 115*c* of the holder 115 in a direction perpendicular to the axial direction 113*d*, and a leading end of the fixing screw 124 is screwed into the female screw hole 115*d*.

As illustrated in FIG. 3, an elongated hole 30 elongated in the axial direction 113*d* is disposed in the upper portion of the upper housing 10*a*, and the fixing screw 124 is inserted into the elongated hole 30. When the fixing screw 124 is loosened, the holder 115 can be moved up and down in FIG. 3.

As illustrated in FIG. 3, the fixing screw 124 is fastened to secure the holder 115 relative to the elongated hole 30 at a position where a predetermined clearance δ is formed between the valve body 113*a* and the nozzle hole 111. The liquid discharge head 1 in this state is delivered as a product.

Nozzle Plate

As illustrated in FIG. 1B and FIGS. 4A and 4B, the nozzle holes 111 are disposed in the nozzle plate 101 along the channel 112 extending from the supply port 11 to the collection port 12. The nozzle holes 111 can be formed by pressing, etching, or the like.

In FIG. 4B, the nozzle holes 111 are arranged in two rows, for example. Four nozzle holes 111 are arranged in each row. Each of these nozzle holes 111 is opened and closed by the valve body 113*a* disposed at the leading end of the needle valve 113. In FIG. 4A, lead wires 2*a* and 2*b* of the connector 2 are connected to the piezoelectric element 114.

In FIG. 4B, the eight nozzle holes 111 are arranged in two rows (four in each row) in the staggered manner in the longitudinal direction of the channel 112. The longitudinal direction (X-axis direction) of the channel 112 is a direction in which the liquid flows from the supply port 11 toward the collection port 12. The liquid to be discharged from the nozzle holes 111 flows from the supply port 11 to the collection port 12 in the channel 112 in a direction indicated by arrows illustrated in FIG. 4B.

The nozzle plate 101 and the housing 10 are made of a material that is resistant to corrosion by the highly pressurized liquid and has sufficient strength to withstand the pressure of the highly pressurized liquid. The materials of the nozzle plate 101 and the housing 10 are not particularly limited and can be appropriately selected according to the intended purpose.

Examples of the materials of the nozzle plate 101 and the housing 10 includes stainless steel, Al, Bi, Cr, InSn, indium tin oxide (ITO), Nb, $Nb_2O_5$, NiCr, Si, $SiO_2$, Sn, $Ta_2O_5$, Ti, W, ZAO (aluminum-doped zinc oxide, $ZnO+Al_2O_3$), Zn, or the like. Each of these materials can be used alone or in combination with others. Among these materials, stainless steel is preferable for rust prevention.

Embodiments 1 to 6 of the nozzle plate 101 are described below.

Embodiment 1

Figure 5A:
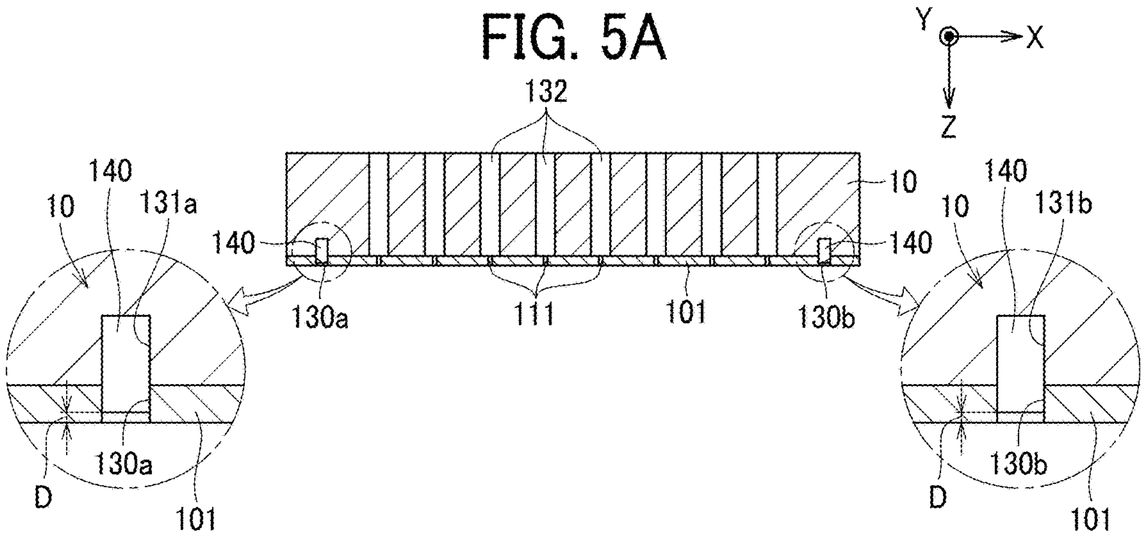
FIG. 5A is a cross-sectional view of a housing of the liquid discharge head according to Embodiment 1 of the present disclosure.
Figure 5B:
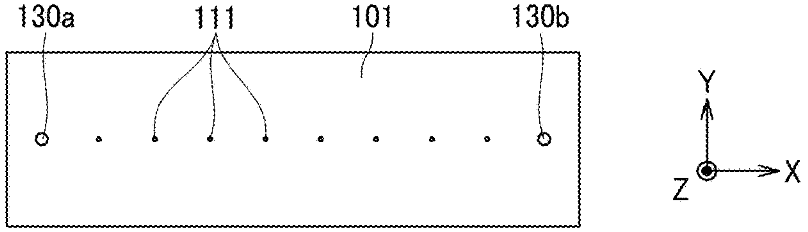
FIG. 5B is a plan view of a nozzle plate of the liquid discharge head according to Embodiment 1.
Figure 5C:
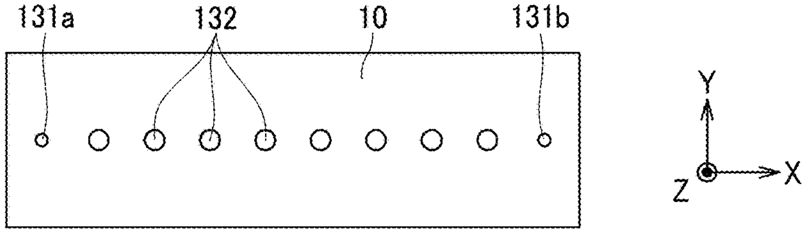
FIG. 5C is a bottom view of the housing.
Figure 5D:
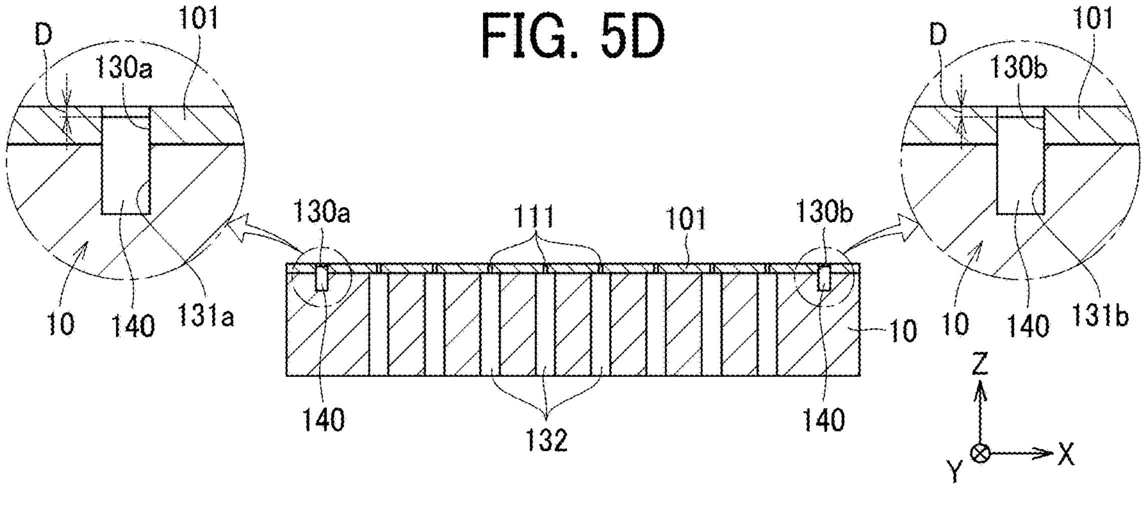
FIG. 5D is a cross-sectional view of the housing during diffusion bonding.

FIGS. 5A to 5D illustrate Embodiment 1. FIG. 5A is a cross-sectional view of the housing 10, FIG. 5B is a plan view of the nozzle plate 101. FIG. 5C is a bottom view of the housing 10, and FIG. 5D is a cross-sectional view of the housing 10 during the diffusion bonding.

The nozzle plate 101 and the housing 10 are made of stainless steel (e.g., SUS430), for example. The nozzle plate 101 and the housing 10 made of the same material can reduce strain due to a difference in thermal expansion coefficient. The nozzle plate 101 is a rectangular flat plate and have, for example, a length of 80 mm, a width of 25 mm, a thickness of 0.2 mm, and the surface roughness Ra of 0.01 μm or less.

As illustrated in FIG. 5A, a pair of left and right positioning pins 140 are implanted in positioning holes 131*a* and 131*b* of the housing 10. The positioning holes 131*a* and 131*b* extend in a direction (Z-axis direction) perpendicular to the lower face of the housing 10 on which the nozzle plate 101 is disposed (i.e., a thickness direction of the housing 10). The direction perpendicular to the lower face of the housing 10 corresponds to a thickness direction of the nozzle plate 101, which is the same as the thickness direction of the housing 10. The positioning pin 140 is made of stainless steel (e.g., SUS430). The positioning pin 140 has a length of 2.4 mm and a diameter of 0.99 mm, for example.

Through holes 132 into which the needle valves 113 are inserted are disposed between the pair of left and right positioning pins 140 in the housing 10. The through hole 132 can be formed by drilling and has an inner diameter of 2.7 mm, for example.

As illustrated in FIG. 5D, the positioning pin 140 has the length so as to fits into each of positioning holes 130*a* and 130*b* of the nozzle plate 101 and so as not to project outward from the positioning holes 130*a* and 130*b*. In detail, the positioning holes 131*a* and 131*b* of the housing 10 have an effective depth of 2.3 mm, for example. The nozzle plate 101 has the thickness of 0.2 mm as described above.

Accordingly, the positioning holes 130*a* and 130*b* of the nozzle plate 101, which are described later, extending (i.e., penetrating through the nozzle plate 101) in the thickness direction have a depth of 0.2 mm, and the sum of the depth of 0.2 mm and the effective depth of 2.3 mm equals the total depth of 2.5 mm. Since the length of the positioning pin 140 is 2.4 mm, an end of the positioning pin 140 is set back inside the positioning holes 130*a* and 130*b* of the nozzle plate 101 by a depth D of 0.1 mm and does not project outside the positioning holes 130*a* and 130*b*.

The positioning pin 140 may has the length of 2.5 mm at maximum so as not to project outward from the positioning holes 130*a* and 130*b*. In this case, the end of the positioning pin 140 is at the same height as outer edges of the positioning holes 130*a* and 130*b*, and does not interfere with a pressure plate during diffusion bonding.

At least two positioning pins 140 are used to position the nozzle plate 101 relative to the housing 10. As the number of the positioning pins 140 increases, the bonding strength of the nozzle plate 101 can be increased as described later.

Conventionally, the positioning pin 140 is removable in order to avoid interference between the positioning pin 140 and the pressure plate during the diffusion bonding. In the present embodiment, since the positioning pin 140 is left in place during the diffusion bonding, and is not removed after the diffusion bonding.

The nozzle plate 101 illustrated in FIG. 5B is directly mounted on the lower face of the housing 10 on which the positioning pins 140 are disposed. The nozzle plate 101 is the rectangular flat plate, and eight nozzle holes 111 are arranged in a row at equal intervals in the longitudinal direction (X-axis direction) of the nozzle plate 101 as illustrated in FIG. 5B. The nozzle holes 111 may be arranged in two rows as illustrated in FIG. 4B, or in three or more rows.

The positioning holes 130*a* and 130*b* are spaced outboard of the nozzle holes 111 and the through holes 132 at both the extreme ends in the longitudinal direction. The positioning holes 130*a* and 130*b* are formed at both end portions of the nozzle plate 101 in the longitudinal direction (X-axis direction). In the present embodiment, both the end portions of the nozzle plate 101 in the longitudinal direction correspond to regions outside the nozzle holes 111 at both the extreme ends in the longitudinal direction (X-axis direction) of the nozzle plate 101. Both the positioning holes 130*a* and 130*b* are round holes having a diameter of 1.01 mm, and extend in the thickness direction (Z-axis direction) of the nozzle plate 101. The positioning holes 130*a* and 130*b* can be formed by drilling or the like.

Figure 6:
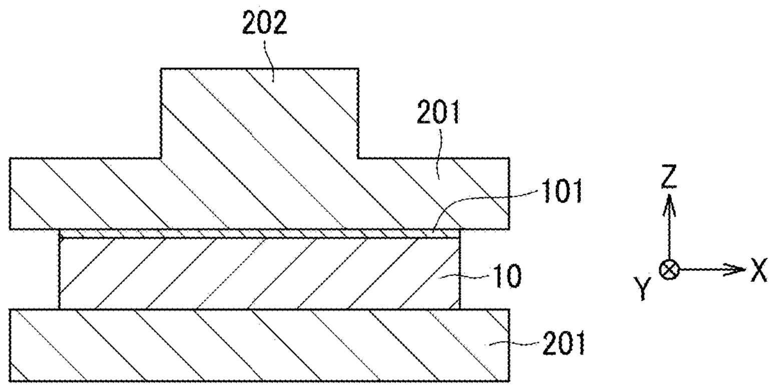
FIG. 6 is a cross-sectional view of a laminated plate of the liquid discharge head set in a diffusion bonding apparatus.

The housing 10 and the nozzle plate 101 illustrated in FIG. 5D are set between a pair of upper and lower pressure plates 201 of a diffusion bonding apparatus as illustrated in FIG. 6, and a top ram 202 is slid downward to press and bond the housing 10 and the nozzle plate 101 to each other. For example, a vacuum hot press (FVHP-R-750 FRET-300) can be used as the diffusion bonding apparatus. The pressure plates 201 are made of ceramics.

In the diffusion bonding, the pressure plates 201 press the housing 10 and the nozzle plate 101 against each other with a load of 40 kN or more to apply a pressure of 20 MPa or more to an interface between the housing 10 and the nozzle plate 101. In this state, the temperature is raised to in a range of 800 to 1000° C. at a degree of vacuum of $1.0\times10^{-4}$ Pa, and then the temperature is held for 10 minutes to 1 hour to perform the diffusion bonding. After the diffusion bonding, the laminated plate in which the housing 10 and the nozzle plate 101 are bonded to each other and the pressure plates 201 are cooled by Ar gas, the pressure of the pressure plate 201 is released, and then the laminated plate (the housing 10 and the nozzle plate 101 bonded in the single bonded body) is taken out of the diffusion bonding apparatus.

Since the positioning pin 140 has an outer diameter of 0.99 mm, a positional deviation of the nozzle plate 101 relative to the housing 10 due to the diffusion bonding is 20 μm at maximum. A positional tolerance of the nozzle plate 101 can be set to, for example, 25 μm, which is described later. Accordingly, the positional deviation of the nozzle plate 101 of 20 μm is within an allowable range, for example.

Embodiment 2

Figure 7A:
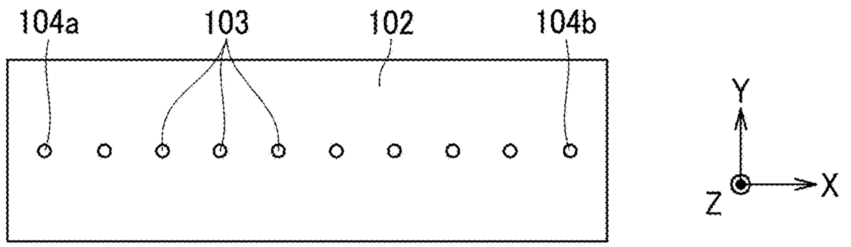
FIG. 7A is a plan view of the nozzle plate according to Embodiment 2 of the present disclosure.
Figure 7B:
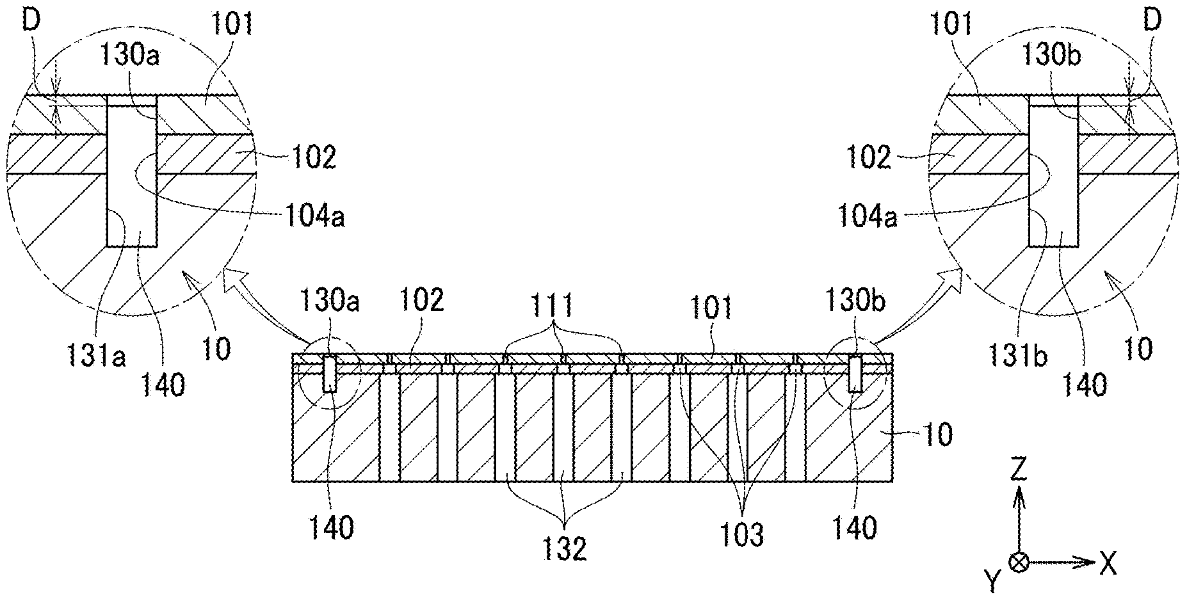
FIG. 7B is a cross-sectional view of the housing during the diffusion bonding according to Embodiment 2.

FIG. 7A is a plan view of a second nozzle plate 102 according to Embodiment 2 of the present disclosure, and FIG. 7B is a cross-sectional view of the housing 10 during the diffusion bonding according to Embodiment 2. In Embodiment 2, as illustrated in FIG. 7B, the second nozzle plate 102 having the same size as the nozzle plate 101 is interposed between the nozzle plate 101 and the housing 10 described in Embodiment 1. In the present embodiment, the nozzle plate 101 may be referred to as an outer nozzle plate 101 so as to be distinguished from the second nozzle plate 102.

The second nozzle plate 102 is a rectangular flat plate and have, for example, a length of 80 mm, a width of 25 mm, a thickness of 0.3 mm, and the surface roughness Ra of 0.01 μm or less. The second nozzle plate 102 laminated over the nozzle plate 101 can increase the bonding strength around the positioning pin 140 to reinforce the nozzle plate 101, thereby reducing the concentricity. In addition, a length of the nozzle hole 111 can be substantially extended to enhance the flying stability of the droplets of the liquid discharged from the nozzle holes 111.

Nozzle holes 103 of the second nozzle plate 102 are larger than the nozzle holes 111 of the outer nozzle plate 101. Other than that, the second nozzle plate 102 is the same as the outer nozzle plate 101 except that the thickness of the second nozzle plate is 0.3 mm. Thus, the positional deviation between the outer nozzle plate 101 and the second nozzle plate 102 is 20 μm at maximum, which is within the allowable range.

Since the nozzle holes 103 of the second nozzle plate 102 are larger than the nozzle holes 111 of the outer nozzle plate 101, the flow of the pressurized liquid in the nozzle holes 111 and 103 can be rectified, and a discharge direction of the droplets of the liquid discharged from the nozzle holes 111 can be stabilized. Further, even when the diameter of the nozzle hole 111 is small, the large nozzle holes 103 of the second nozzle plate 102 larger than the nozzle holes 111 can adjust the volume of the pressurized liquid in the nozzle holes 111 and 103, thereby adjusting the volume of the droplets of the liquid discharged from the nozzle holes 111 with high accuracy.

Positioning holes 104*a* and 104*b* are formed at both end portions of the second nozzle plate 102 in the longitudinal direction (X-axis direction). The positioning holes 104*a* and 104*b* correspond to the positioning holes 131*a* and 131*b* of the housing 10. Both the positioning holes 104*a* and 104*b* are round holes having a diameter of 1.01 mm.

The positioning holes 104*a* and 104*b* are the round holes extending in the thickness direction of the nozzle plate 101.

In the present embodiment, both the end portions of the second nozzle plate 102 in the longitudinal direction correspond to regions outside the nozzle holes 111 at both the extreme ends in the longitudinal direction (X-axis direction) of the nozzle plate 101.

The housing 10 used in Embodiment 2 has the same configuration as that in Embodiment 1 illustrated in FIGS. 5A and 5C. As illustrated in FIG. 7B, the pair of left and right positioning pins 140 are implanted in the positioning holes 131*a* and 131*b* of the housing 10. The positioning holes 131*a* and 131*b* extend in the direction (Z-axis direction) perpendicular to the lower face of the housing 10 on which the second nozzle plate 102 is disposed. The direction perpendicular to the lower face of the housing 10 on which the second nozzle plate 102 is disposed corresponds to the thickness direction of the nozzle plate 101. The positioning pin 140 is made of stainless steel (e.g., SUS430). The positioning pin 140 has a length of 2.7 mm and a diameter of 0.99 mm, for example.

The nozzle plate 101 used in Embodiment 2 has the same configuration as that in Embodiment 1 illustrated in FIG. 5B. The nozzle plate 101 is the rectangular flat plate and have, for example, a length of 80 mm, a width of 25 mm, a thickness of 0.2 mm, and the surface roughness Ra of 0.01 μm or less. The positioning holes 130*a* and 130*b* are spaced outboard of the nozzle holes 111 and the through holes 132 at both the extreme ends in the longitudinal direction. Both the positioning holes 130*a* and 130*b* are the round holes having the diameter of 1.01 mm. That is, the positioning holes 130*a* and 130*b* are the round holes extending in the thickness direction of the nozzle plate 101.

The positioning pin 140 used in Embodiment 2 is the same as that in Embodiment 1 except that the length of the positioning pin 140 is 2.7 mm. When the positioning holes 131*a* and 131*b* of the housing 10 has an effective depth of 2.3 mm, since the sum of the thicknesses of the nozzle plates 101 and the second nozzle plate 102 is 0.5 mm, the total effective depth of the positioning holes into which the positioning pin 140 fits equals 2.8 mm. Since the length of the positioning pin 140 is 2.7 mm, which is shorter than 2.8 mm, the end of the positioning pin 140 does not project outward from the positioning holes 130*a* and 130*b*.

Embodiment 3

Figure 8A:
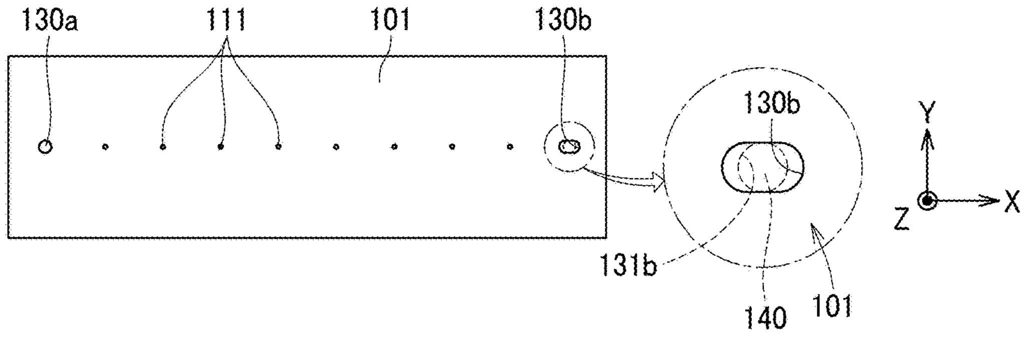
FIG. 8A is a plan view of the nozzle plate according to Embodiment 3 of the present disclosure.
Figure 8B:
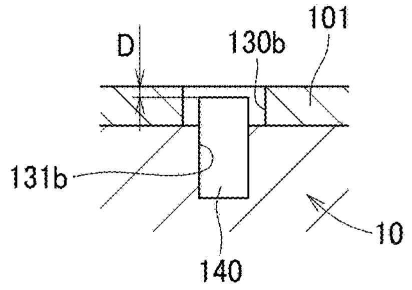
FIG. 8B is an enlarged partial cross-sectional view of the housing during the diffusion bonding according to Embodiment 3.

FIG. 8A is a plan view of the nozzle plate 101 according to Embodiment 3 of the present disclosure, and FIG. 8B is an enlarged cross-sectional view of the positioning pin 140 as a positioning member that positions the nozzle plate 101 relative to the housing 10 during the diffusion bonding and the surrounding thereof according to Embodiment 3. One positioning hole 130*a* (on the left end portion of the nozzle plate 101 in FIG. 8A) is a round hole having a diameter of 1.01 mm, and the other positioning hole 130*b* (on the right end portion of the nozzle plate 101 in FIG. 8A) is a slotted hole having a width of 1.01 mm and a length of 1.05 mm. The other configurations are the same as in Embodiment 1. FIG. 8B is an enlarged cross-sectional view of the positioning pin 140 (on the right side in FIG. 8A) in the positioning hole 130*b* of the nozzle plate 101 and the positioning hole 131*b* of the housing 10, and the surrounding thereof.

Also in Embodiment 3, since the positioning hole 130*a* on one side, which is the round hole, is used as a reference position, the positional deviation of the nozzle plate 101 is 20 μm at maximum. In Embodiment 3 illustrated in FIGS. 8A and 8B, since the positioning hole 130*b* on the other side is the slotted hole elongated in the longitudinal direction of the nozzle plate 101, the positioning hole 130*b* allows the nozzle plate 101 to deform and expand in the longitudinal direction due to heating during the diffusion bonding, thereby reducing the strain of the nozzle plate 101.

Embodiment 4

Figure 9A:
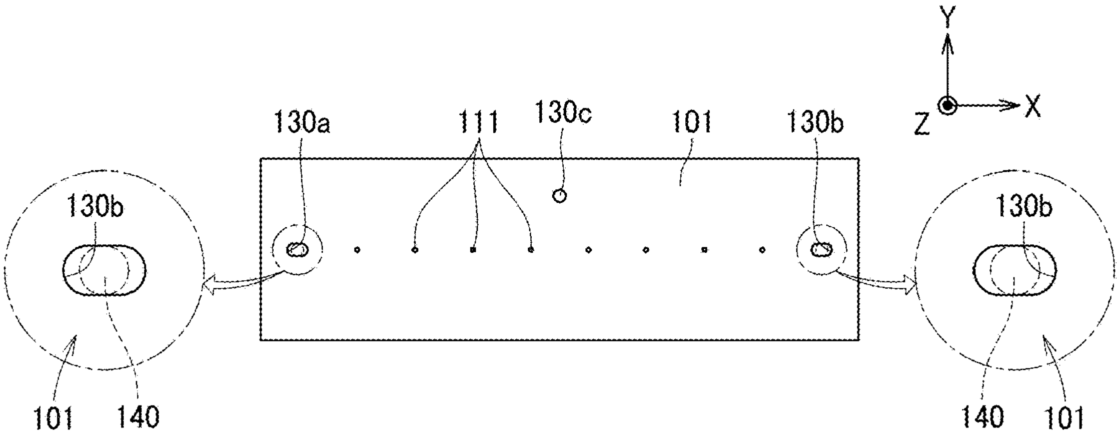
FIG. 9A is a plan view of the nozzle plate according to Embodiment 4 of the present disclosure.
Figure 9B:
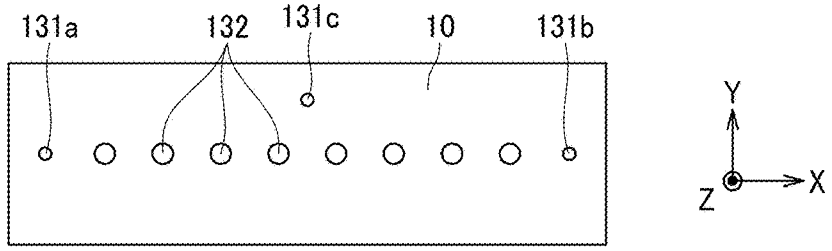
FIG. 9B is a plan view of a side of the housing on which the nozzle plate is disposed according to Embodiment 4.

FIG. 9A is a plan view of the nozzle plate 101 according to Embodiment 4 of the present disclosure, and FIG. 9B is a plan view of the lower face of the housing 10 on which the nozzle plate 101 is disposed according to Embodiment 4. In Embodiment 4, three positioning holes 130*a*, 130*b*, and 130*c* are disposed at both end portions and a center portion in the longitudinal direction of the nozzle plate 101 as illustrated in FIG. 9A.

The positioning holes 130*a* and 130*b* at both the end portions in the longitudinal direction of the nozzle plate 101 are slotted holes having a width of 1.01 mm and a length of 1.05 mm. The positioning holes 130*a* and 130*b*, which are the slotted holes, is elongated in the longitudinal direction of the nozzle plate 101.

In the present embodiment, both the end portions of the nozzle plate 101 in the longitudinal direction correspond to regions outside the nozzle holes 111 at both the extreme ends in the longitudinal direction (X-axis direction) of the nozzle plate 101. In addition, in the present embodiment, the center portion in the longitudinal direction is disposed between the nozzle holes 111 at both the extreme ends of the nozzle row in the longitudinal direction (X-axis direction) of the nozzle plate 101, and is preferably disposed at a substantially middle position between the nozzle holes 111 at both the extreme ends.

The positioning hole 130*c* at the center portion in the longitudinal direction (X-axis direction) of the nozzle plate 101 is a round hole having a diameter of 1.01 mm. The positioning hole 130*c* is disposed at a position away from the positions of the nozzle holes 111 and the through holes 132 of the housing 10 toward one side (+Y direction) in a transverse direction of the nozzle plate 101.

In the housing 10 illustrated in FIG. 9B, the positioning holes 131*a*, 131*b*, and 131*c* are disposed at positions corresponding to the positioning holes 130*a*. 130*b*, and 130*c* of the nozzle plate 101 illustrated in FIG. 9A, respectively. The same positioning pin 140 as that in Embodiment 1 is implanted in each of the positioning holes 131*a*, 131*b*, and 131*c* of the housing 10.

The positioning hole 130*c* at the center portion of the nozzle plate 101 serves as a reference hole in the Y-axis direction and the X-axis direction, i.e., the longitudinal direction and the transverse direction of the nozzle plate 101 (the top and bottom direction and the lateral direction in FIG. 9A). The positioning holes 130*a* and 130*b* at both the end portions position the nozzle plate 101 in the Y-axis direction, i.e., the transverse direction of the nozzle plate 101 (the top and bottom direction in FIG. 9A). The other configurations are the same as in Embodiment 1.

In Embodiment 4, since the positioning holes 130*a* and 130*b* at both the end portions are the slotted holes, similarly to Embodiment 3, the positioning holes 130*a* and 130*b* allow the nozzle plate 101 to deform and expand in the longitudinal direction due to the heating during the diffusion bonding, thereby reducing the strain of the nozzle plate 101. Further, the positioning hole 130*c* at the center portion of the nozzle plate 101 positions the nozzle plate 101 in the Y-axis direction and the X-axis direction, i.e., the longitudinal direction and the transverse direction of the nozzle plate 101 (the top and bottom direction and the lateral direction in FIG. 9A) with high accuracy.

Embodiment 5

Figure 10A:
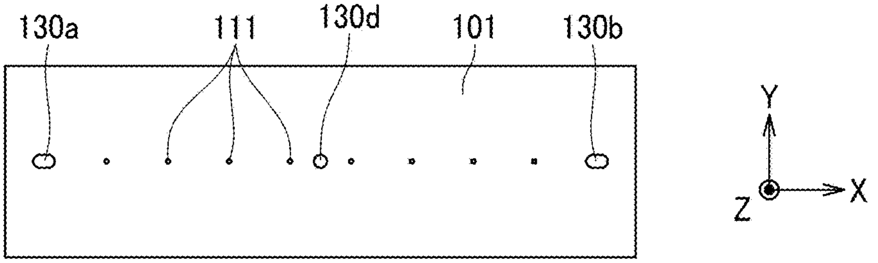
FIG. 10A is a plan view of the nozzle plate according to Embodiment 5 of the present disclosure.
Figure 10B:
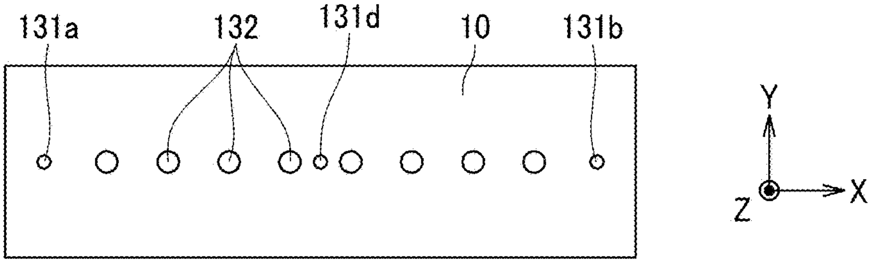
FIG. 10B is a plan view of a side of the housing on which the nozzle plate is disposed according to Embodiment 5.

FIG. 10A is a plan view of the nozzle plate 101 according to Embodiment 5 of the present disclosure, and FIG. 10B is a plan view of the lower face of the housing 10 on which the nozzle plate 101 is disposed according to Embodiment 5. In Embodiment 5, three positioning holes 130*a*, 130*b*, and 130*d* are disposed at both end portions and a center portion in the longitudinal direction of the nozzle plate 101 as illustrated in FIG. 10A.

The nozzle plate 101 according to Embodiment 5 is the same as that in Embodiment 4 except that the positioning hole 130*d* in the center portion is disposed in the row of the nozzle holes 111. In the present embodiment, both the end portions of the nozzle plate 101 in the longitudinal direction correspond to regions outside the nozzle holes 111 at both the extreme ends in the longitudinal direction (X-axis direction) of the nozzle plate 101. In addition, in the present embodiment, the center portion in the longitudinal direction is disposed between the nozzle holes 111 at both the extreme ends of the nozzle row in the longitudinal direction (X-axis direction) of the nozzle plate 101, and is preferably disposed at a substantially middle position between the nozzle holes 111 at both the extreme ends.

The positioning holes 130*a* and 130*b* at both the end portions in the longitudinal direction of the nozzle plate 101 are slotted holes having a width of 1.01 mm and a length of 1.05 mm. The positioning holes 130*a* and 130*b*, which are the slotted holes, is elongated in the longitudinal direction of the nozzle plate 101.

The positioning hole 130*d* at the center portion in the longitudinal direction of the nozzle plate 101 is a round hole having a diameter of 1.01 mm. This positioning hole 130*d* is disposed in the middle between the fourth and fifth nozzle holes 111 from the left in FIG. 10A.

In the housing 10 illustrated in FIG. 10B, the positioning holes 131*a*. 131*b*, and 131*d* are disposed at positions corresponding to the positioning holes 130*a*, 130*b*, and 130*d* of the nozzle plate 101 illustrated in FIG. 10A, respectively. The same positioning pin 140 as that in Embodiment 1 is implanted in each of the positioning holes 131*a*, 131*b*, and 131*d* of the housing 10. The housing 10 according to Embodiment 5 is the same as that in Embodiment 4 except that the positioning hole 131*d* in the center portion is disposed in the row of the through holes 132.

In the nozzle plate 101 according to the present embodiment, the positioning hole 130*d* between the nozzle holes 111 serves as a reference position for expansion deformation of the nozzle plate 101 in the longitudinal direction due to the heating during the diffusion bonding, thereby advantageously reducing the positional deviation of each nozzle hole 111.

Embodiment 6

Figure 11A:
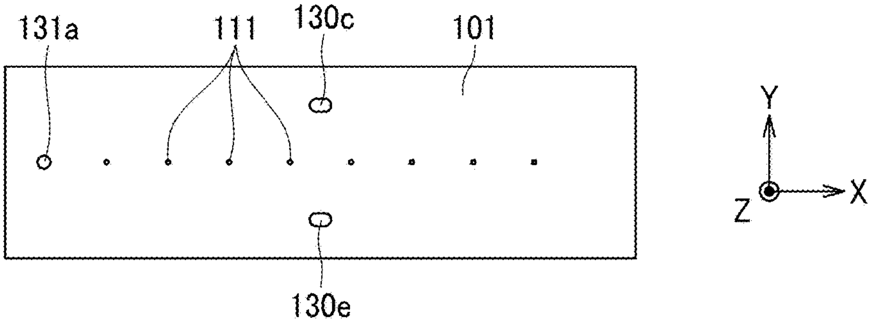
FIG. 11A is a plan view of the nozzle plate according to Embodiment 6 of the present disclosure.
Figure 11B:
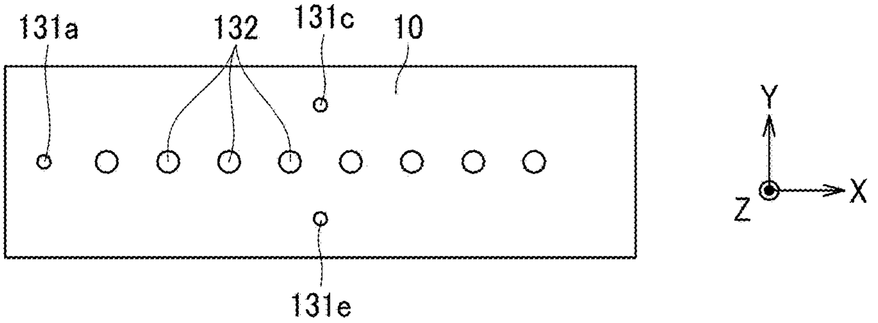
FIG. 11B is a plan view of a side of the housing on which the nozzle plate is disposed according to Embodiment 6.

FIG. 11A is a plan view of the nozzle plate 101 according to Embodiment 6 of the present disclosure, and FIG. 11B is a plan view of the lower face of the housing 10 on which the nozzle plate 101 is disposed according to Embodiment 6. In Embodiment 6, a positioning hole 130*a* is disposed at one end portion and two positioning holes 130*c* and 130*e* are disposed at a center portion, three in total, in the longitudinal direction of the nozzle plate 101 as illustrated in FIG. 11A.

In the present embodiment, the one end portion of the nozzle plate 101 in the longitudinal direction correspond to a region outside the nozzle holes 111 at one of both the extreme ends in the longitudinal direction (X-axis direction) of the nozzle plate 101. In addition, in the present embodiment, the center portion in the longitudinal direction is disposed between the nozzle holes 111 at both the extreme ends of the nozzle row in the longitudinal direction (X-axis direction) of the nozzle plate 101, and is preferably disposed at a substantially middle position between the nozzle holes 111 at both the extreme ends.

The positioning hole 130*a* at the one end portion in the longitudinal direction is a round hole having a diameter of 1.01 mm. The two positioning holes 130*c* and 130*e* at the center portion in the longitudinal direction of the nozzle plate 101 are slotted holes having a width of 1.01 mm and a length of 1.05 mm.

A direction of a major axis of the slotted hole is the longitudinal direction of the nozzle plate 101 (the X-axis direction which is the lateral direction in FIG. 11A). The positioning holes 130*c* and 130*e* are disposed at positions away from the positions of the nozzle holes 111 and the through holes 132 of the housing 10 toward both sides in the transverse direction of the nozzle plate 101 (the Y-axis direction which is the top and bottom direction in FIG. 11A).

In the housing 10 illustrated in FIG. 11B, the positioning holes 131*a*, 131*c*, and 131*e* are disposed at positions corresponding to the positioning holes 130*a*, 130*c*, and 130*e* of the nozzle plate 101 illustrated in FIG. 11A, respectively. The positioning holes 131*a*, 131*c*, and 131*e* are spaced apart from the through holes 132. The same positioning pin 140 as that in Embodiment 1 is implanted in each of the positioning holes 131*a*, 131*c*, and 131*e* of the housing 10.

In Embodiment 6, the positioning hole 130*a* at the one end portion in the longitudinal direction serves as a reference hole in the X-axis direction and the Y-axis direction (the top and bottom direction and the lateral direction in FIG. 11A). Since the two positioning holes 130*c* and 130*e* at the center portion are the slotted holes, the positioning holes 130*c* and 130*e* allow the nozzle plate 101 to deform and expand in the longitudinal direction (the X-axis direction which is the lateral direction in FIG. 11A) due to the heating during the diffusion bonding, thereby reducing the strain of the nozzle plate 101.

Bonding State Around Positioning Pin

Figure 12A:
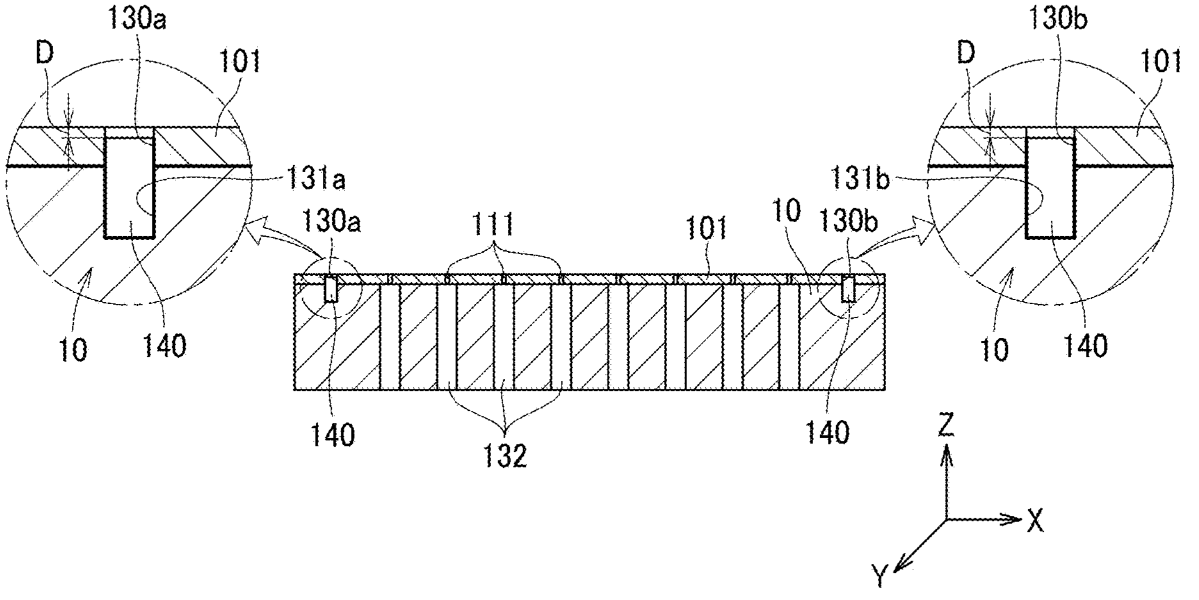
FIG. 12A is a cross-sectional view of the housing during the diffusion bonding according to Embodiments 1 to 4.
Figure 12B:
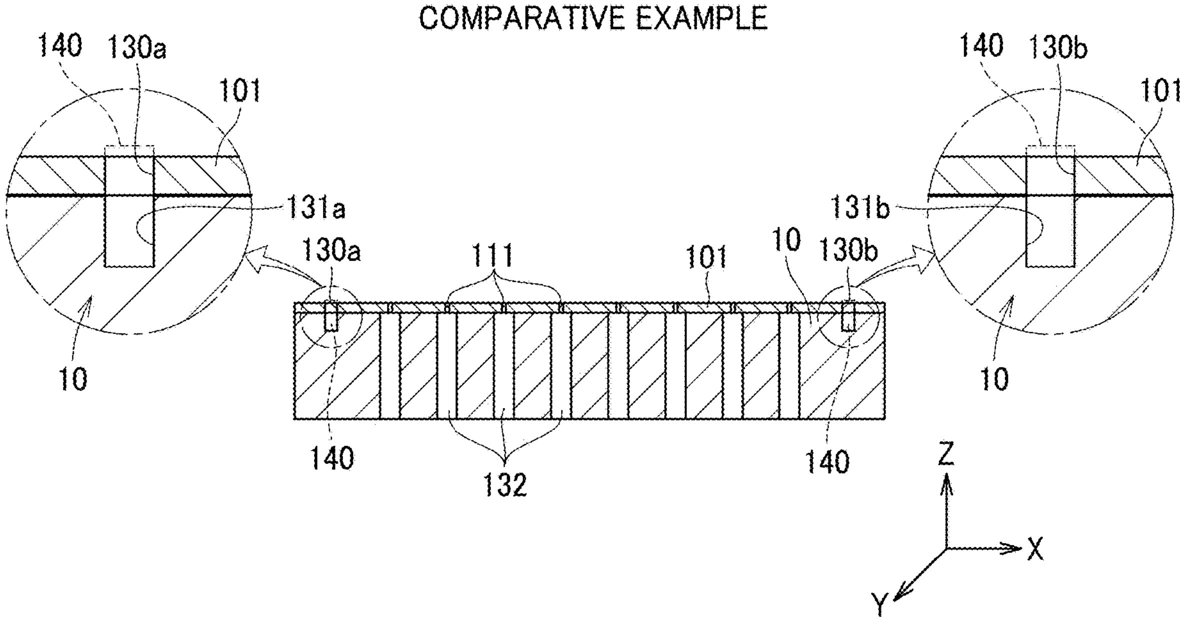
FIG. 12B is a cross-sectional view of the housing according to Comparative Example 1.

FIGS. 12A and 12B illustrate a bonding state around the positioning pin 140. FIG. 12A illustrates the bonding state according to the present embodiment in which the positioning pins 140 are left in place of the positioning holes 130*a*, 131*a*, 130*b*, and 131*b* during the diffusion bonding. FIG. 12B illustrates the bonding state according to a comparative example (e.g., Comparative Example 1) in which the positioning pins 140 are pulled out from the positioning holes 130*a*, 131*a*, 130*b*, and 131*b* before the diffusion bonding.

As indicated by thick lines in FIGS. 12A and 12B, a bonding area in the present embodiment is larger than a bonding area in the comparative example around the positioning pin 140 by an outer circumferential surface (interface in the Z-axis direction) and an end surface (X-Y interface) of the positioning pins 140, thereby increasing the bonding strength. Since the ends of the positioning pins 140 do not project outward from the positioning holes 130*a* and 130*b* of the nozzle plate 101, the positioning pins 140 do not interfere with the pressure plate 201 during the diffusion bonding.

As described later with reference to FIGS. 15 and 16, when the liquid discharge head 1 is used in a liquid discharge apparatus 500, the liquid discharge head 1 can be moved close to an object 700 on which an image is printed or an object to be coated. Further, the positioning pins 140 do not hinder a blade or cloth from wiping the liquid discharge head 1 to clean the surface of the liquid discharge head 1, thereby maintaining a performance of the liquid discharge head 1.

Deviation of Nozzle Plate Due to Thermal Expansion

Figure 13A:
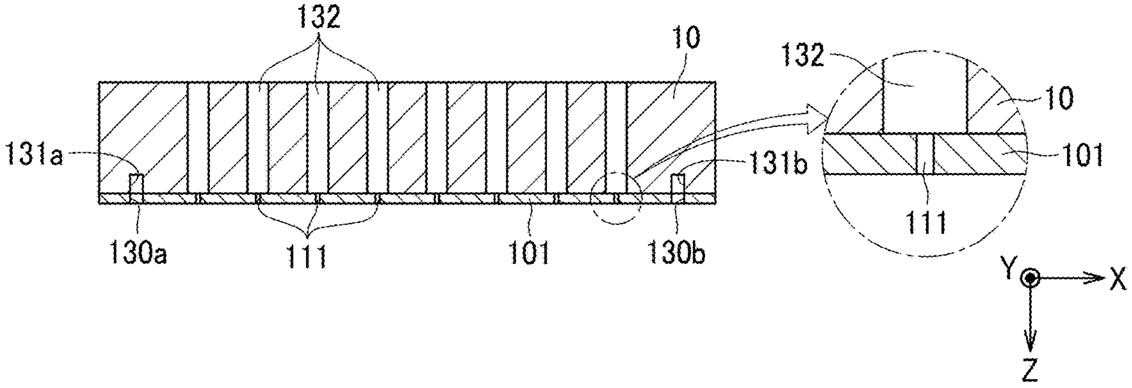
FIGS. 13A and 13B are cross-sectional views of the housing illustrating thermal expansion of the housing during the diffusion bonding according to Comparative Example 1.
Figure 13B:
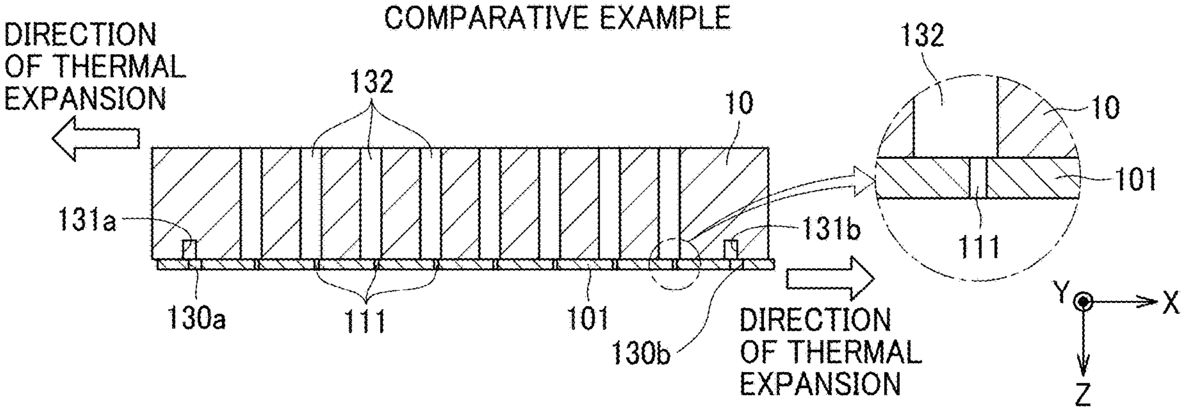

FIGS. 13A and 13B are cross-sectional views of the housing 10 illustrating thermal expansion of the nozzle plate 101 during the diffusion bonding according to Comparative Example 1. FIG. 13A illustrates a state immediately after the nozzle plate 101 is positioned relative to the housing 10 by the positioning pins 140 and then the positioning pins 140 are pulled out from the positioning holes 130*a*, 131*a*. 130*b*, and 131*b*.

FIG. 13B illustrates a state after the housing 10 and the nozzle plate 101 are bonded to each other by the diffusion bonding. Central axes of the nozzle holes 111 and the through holes 132 coincide with each other in the state immediately after positioning as illustrated in FIG. 13A. However, the nozzle plate 101 thermally expands and the central axes of the nozzle holes 111 and the through holes 132 deviate from each other without the positioning pins 140 during the diffusion bonding as illustrated in FIG. 13B (i.e., a deviation due to thermal expansion).

In the present embodiment, the positioning pins 140 are left in place in the housing 10 and the nozzle plate 101 during the diffusion bonding, thereby preventing the housing 10 and the nozzle plate 101 from being deviated from each other due to the heating during the diffusion bonding. In addition, it is unnecessary to remove the positioning pins 140 immediately before the diffusion bonding.

Comparison Among Embodiments 1 to 4 and Comparative Examples 1 and 2

FIG. 14 is a table illustrating the concentricity of the laminated plate according to Embodiments 1 to 4 and Comparative Examples 1 and 2. According to Comparative Example 2, in Comparative Example 1, the housing 10 and the nozzle plate 101 are temporarily fixed to each other by spot welding before the positioning pins 140 are pulled out.

In the spot welding, a pressing force between the housing 10 and the nozzle plate 101 was 0.5 to 3 kN, a pressing time was 0.1 to 5 sec. a heating temperature of the surface of the nozzle plate 101 was 1000 to 1500° C., and a weld diameter was 1 to 10 mm. The housing 10 and the nozzle plate 101 were bonded to each other in the single bonded body by the diffusion bonding, similarly to Embodiment 1 except that the positioning pins 140 were removed after the temporary fixing and before the diffusion bonding. The above-described vacuum hot press (FVHP-R-750 FRET-300) was used as the diffusion bonding apparatus.

A CNC VISION MEASURING SYSTEM (QV HYPER 606) was used to evaluate the concentricity. The procedure for evaluating the concentricity is as follows. In a first step, the laminated plate is turned upside down after the diffusion bonding, and a bottom surface of the housing 10 is used as a measurement surface. Center points of circles of the eight through hole 132 on the bottom surface of the housing 10 is acquired.

In a second step, center points of circles of the eight nozzle holes 111 on the bonded interface between the nozzle plate 101 and the housing 10 are acquired. When the nozzle plates 101, the second nozzle plate 102, and the housing 10 are bonded one on another as in Embodiment 2, center points of circles of the eight nozzle holes 111 and the eight nozzle holes 103 at a bonded interface between the nozzle plate 101 and the second nozzle plate 102 are also acquired.

In a third step, a deviation between the acquired center points of circle of the through hole 132 and the nozzle hole 111 at the same position is calculated. In a fourth step, deviations at all the eight positions are calculated, and the maximum deviation is defined as the concentricity.

As illustrated in FIG. 14, the concentricity between the nozzle hole 111 and the through hole 132 was 25 μm or less in Embodiments 1 and 2, and the concentricity between the nozzle hole 111 and the through hole 132 was 15 μm or less in Embodiments 3 and 4. Thus, according to the present embodiments, the liquid discharge head 1 has a good concentricity. When the deviation of the concentricity is about 25 μm, an acceptable image quality can be obtained in practical use.

On the other hand, in Comparative Example 1, the concentricity of the nozzle hole 111 was 70 μm, which exceeded 25 μm. This is because, in Comparative Example 1, the nozzle plate 101 and the housing 10 are largely deviated from each other due to thermal expansion during the diffusion bonding without a restricted point by the positioning pin 140.

Figure 15:
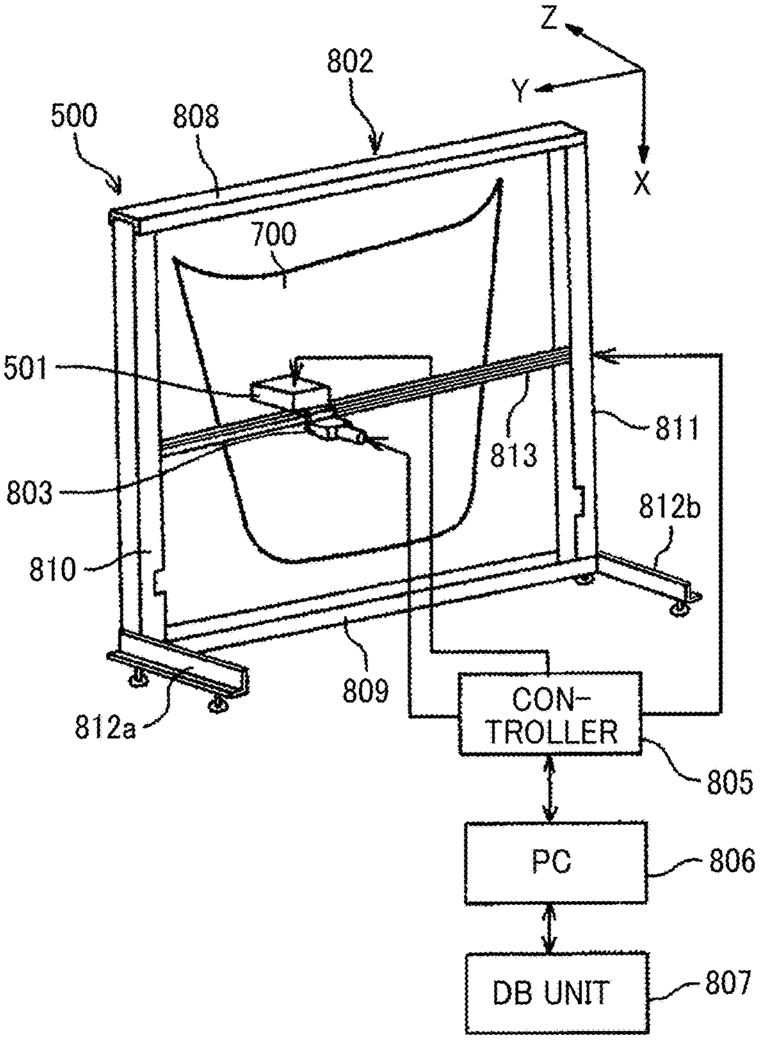
FIG. 15 is a perspective view of a liquid discharge apparatus according to embodiments of the present disclosure.

When the concentricity is more than 25 μm, the droplets of the liquid (e.g., ink) is discharged in an oblique flying direction, causing coating unevenness on the object 700 illustrated in FIG. 15. When the nozzle plate 101 has a length of 80 mm, a linear thermal expansion coefficient of SUS430 is $12.4\times10^{-6}/°$ C., and the laminated plate is heated at 1000° C., the nozzle plate 101 and the housing 10 may be thermally expanded and displaced in opposite directions, resulting in the concentricity of about 2 mm at maximum.

In Comparative Example 2, the liquid (e.g., ink) leaks from the liquid discharge head 1 due to defective bonding. The defective bonding may be caused by the strain or cracks in the housing 10 or the nozzle plate 101 due to the temporary fixing by spot welding.

Liquid Discharge Apparatus

The liquid discharge apparatus 500 using the liquid discharge head 1 illustrated in FIGS. 1A and 1B according to the present embodiment is described with reference to FIGS. 15 and 16. FIG. 15 is a perspective view of the liquid discharge apparatus 500, and FIG. 16 is a perspective view of a drive unit of the liquid discharge apparatus 500.

The liquid discharge apparatus 500 includes a movable frame unit 802 installed to face the object 700 having a curved surface such as a hood of a vehicle. The frame unit 802 includes a left frame 810, a right frame 811, and a movable part 813. The movable part 813 is attached to the left frame 810 and the right frame 811 so that the movable part 813 is bridged between the left frame 810 and the right frame 811. The movable part 813 is vertically movable in the X-axis direction.

A drive unit 803 including a built-in motor and a liquid discharge device 501 attached to the drive unit 803 are mounted on the movable part 813. The drive unit 803 is reciprocally movable in the horizontal direction (Y-axis direction) on the movable part 813. The liquid discharge device 501 discharges a liquid toward the object 700.

Further, the liquid discharge apparatus 500 includes a controller 805 and a data processing device 806. The controller 805 controls a liquid discharge from liquid discharge device 501, a reciprocal movement of the drive unit 803, and a vertical movement of the movable part 813. The data processing device 806 such as a personal computer (PC) sends instructions to the controller 805. The data processing device 806 is connected to a database (DB) unit 807 that records and stores data related to the object 700 such as a shape and a size of the object 700.

The frame unit 802 further includes an upper frame 808 and a lower frame 809 in addition to the left frame 810 and the right frame 811 that form a vertical and horizontal outline of the frame unit 802. The upper frame 808, the lower frame 809, the left frame 810, and the right frame 811 are formed of metal pipes or the like. The frame unit 802 further includes a left leg 812*a* and a right leg 812*b* attached to both ends of the lower frame 809 to make the frame unit 802 to be freestanding. The left leg 812*a* and the right leg 812*b* are perpendicularly and horizontally attached to both the ends of the lower frame 809. The movable part 813 bridged between the left frame 810 and the right frame 811 is vertically movable while supporting the drive unit 803. That is, the movable part 813 functions as a drive mechanism of the liquid discharge device 501 to move the liquid discharge device 501 in the X-axis direction.

A surface of the object 700 is perpendicular to the direction of the liquid discharge (Z-axis direction). Thus, the surface of the object 700 faces a plane formed by the upper frame 808, the lower frame 80), the left frame 810, and the right frame 811 of the frame unit 802. In this case, in order to arrange the object 700 at a predetermined position at which printing is to be performed, a back side of a printing area of the object 700 is sucked and held by a chuck attached to a leading end of a robot arm of a multi-articulated robot, for example. By using the multi-articulated robot, the object 700 can be accurately arranged at a printing position, and the posture of the object 700 can be appropriately changed.

Figure 16:
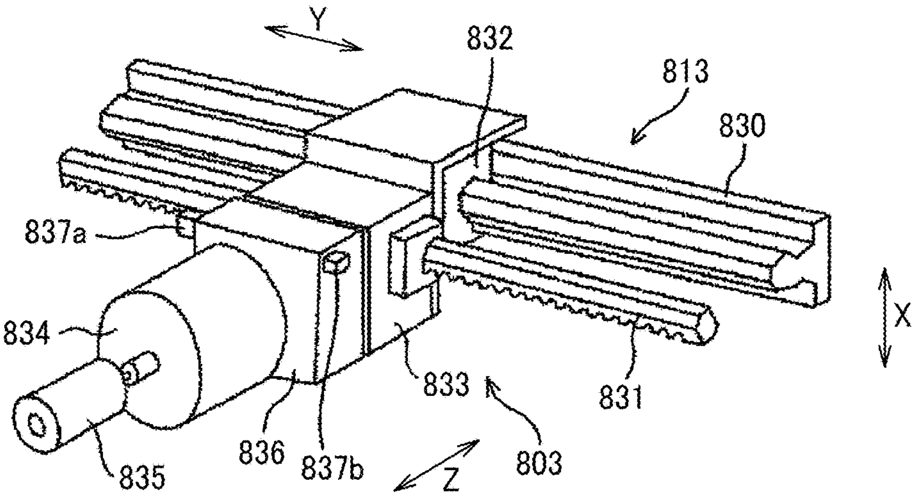
FIG. 16 is a perspective view of a drive unit of the liquid discharge apparatus.

As illustrated in FIGS. 15 and 16, the drive unit 803 is reciprocally movable in the horizontal direction (Y-axis direction) along the movable part 813. The movable part 813 includes a rail 830, a rack gear 831, a linear guide 832, a pinion gear 833, a motor 834, and a rotary encoder 835. The rail 830 is horizontally disposed to bridge between the left frame 810 and the right frame 811 of the frame unit 802. The rack gear 831 is parallel to the rail 830. The linear guide 832 is fitted on a part of the rail 830 and slidably moves along the rail 830. A pinion gear 833 is coupled to the linear guide 832 and meshes with the rack gear 831. The motor 834 includes a decelerator 836 and drives the pinion gear 833 to rotate. The rotary encoder 835 detects a position of a printing point.

The motor 834 is forwardly or reversely driven to move the liquid discharge device 501 rightward or leftward along the movable part 813 in FIGS. 15 and 16. Further, the drive unit 803 functions as the drive mechanism of the liquid discharge device 501 to move the liquid discharge device 501 in the Y-axis direction. The decelerator 836 includes limit switches 837*a* and 837*b* attached to both sides of a case of the decelerator 836.

The liquid discharge device 501 includes, for example, at least one of the multiple liquid discharge heads 1 that discharge liquids of different colors of black, cyan, magenta, yellow, and white, or the liquid discharge head 1 having a plurality of nozzle arrays to discharge the liquids of such different colors. The liquid of each color is supplied under pressure from a liquid tank to each liquid discharge head 1 of the liquid discharge device 501 or each nozzle array of the liquid discharge head 1.

In the liquid discharge apparatus 500, the movable part 813 is moved in the X-axis direction and the liquid discharge device 501 is moved in the Y-axis direction to print a desired image on the object 700. The "liquid discharge apparatus" is not limited to an apparatus that discharges liquid to visualize meaningful images such as letters or figures. For example, the liquid discharge apparatus may be an apparatus that forms meaningless images such as meaningless patterns, a film of paint, or the like, or an apparatus that fabricates three-dimensional images.

Although some embodiments of the present disclosure have been described above, embodiments of the present disclosure are not limited to the embodiments described above, and a variety of modifications can be made within the scope of the present disclosure. For example, arrangements of the positioning holes 130*a* to 130*d* according to Embodiments 1 to 6 can be combined in any combination of the multiple arrangements. The nozzle plate 101 and the housing 10 can be bonded to each other in the single bonded body by a method other than the diffusion bonding, for example, can be bonded by an adhesive or the like.

The channel 112 is not necessarily connected to the circulation passage L. and the present disclosure is also applicable to a liquid discharge head of a type in which all the supplied liquid is discharged from the nozzle holes 111 without the collection port 12. The piezoelectric element 114 is replaceable with another driver that can expand and contract in the longitudinal direction. For example, a piston that expands and contracts in the longitudinal direction by an electromagnetic solenoid may be used instead of the piezoelectric element 114.

Hereinafter, each of aspects of the present disclosure is additionally described.

Aspect 1

According to Aspect 1, a liquid discharge head includes a nozzle plate, a housing, a channel, and a positioning member. The nozzle plate has a nozzle hole from which a liquid is discharged and a first positioning hole penetrating through the nozzle plate in a thickness direction of the nozzle plate. The housing is bonded to the nozzle plate to form a single bonded body and has a second positioning hole extending in a thickness direction of the housing. The channel is disposed between the nozzle plate and the housing. The liquid flows through the channel to the nozzle hole. The positioning member fits into the first positioning hole and the second positioning hole to position the nozzle plate relative to the housing. A length of the positioning member in the thickness direction of the nozzle plate is smaller than a sum of a length of the first positioning hole and a length of the second positioning hole in the thickness direction of the nozzle plate, and larger than the length of the second positioning hole in the thickness direction of the nozzle plate.

Aspect 2

According to Aspect 2, in Aspect 1, the liquid discharge head further includes a needle valve to open and close the nozzle hole. The housing further has a through hole through which the needle valve is slidable. The nozzle plate and the housing are bonded to each other to form the single bonded body with the through hole and the nozzle hole concentric with each other Aspect 3

According to Aspect 3, in Aspect 1 or 2, the nozzle plate, the housing, and the positioning member are made of stainless steel.

Aspect 4

According to Aspect 4, in any one of Aspects 1 to 3, the nozzle plate and the housing are directly bonded to each other in the single bonded body.

Aspect 5

According to Aspect 5, in any one of Aspects 1 to 4, the nozzle plate includes multiple plates laminated one on another.

Aspect 6

According to Aspect 6, in any one of Aspects 1 to 5, the liquid discharge head further includes multiple nozzle holes including the nozzle hole and multiple first positioning holes including the first positioning hole. The multiple nozzle holes are arranged in a longitudinal direction of the nozzle plate in a row. The multiple first positioning holes are disposed at both end portions of the row of the multiple nozzle holes in the longitudinal direction.

Aspect 7

According to Aspect 7, in any one of Aspects 1 or 5, the liquid discharge head further includes multiple nozzle holes including the nozzle hole and multiple first positioning holes including the first positioning hole. The multiple nozzle holes are arranged in a longitudinal direction of the nozzle plate in a row. The multiple first positioning holes are disposed at both end portions of the row of the multiple nozzle holes and a center portion of the nozzle plate in the longitudinal direction. The center portion is shifted from the row in a direction orthogonal to the longitudinal direction.

Aspect 8

According to Aspect 8, in Aspect 6 or 7, each of the multiple first positioning holes is a round hole.

Aspect 9

According to Aspect 9, in Aspect 6 or 7, one of the multiple first positioning holes at one of the both end portions in the longitudinal direction is a round hole, and another of the multiple first positioning holes at another of the both end portions in the longitudinal direction is a slotted hole elongated in the longitudinal direction.

Aspect 10

According to Aspect 10, in Aspect 7, two of the multiple first positioning holes at the both end portions in the longitudinal direction are slotted holes elongated in the longitudinal direction, and one of the multiple first positioning holes at the center portion in the longitudinal direction is a round hole.

Aspect 11

According to Aspect 11, in any one of Aspects 1 to 10, the positioning member is a pin and is diffusion bonded to the first positioning hole and the second positioning hole.

Aspect 12

According to Aspect 12, a liquid discharge device includes the liquid discharge head according to any one of Aspects 1 or 11 to discharge the liquid to an object.

Aspect 13

According to Aspect 13, a liquid discharge apparatus includes the liquid discharge device according to Aspect 12 and a drive mechanism to move the liquid discharge device relative to the object.

Aspect 14

According to Aspect 14, a method of manufacturing a liquid discharge head includes forming a nozzle hole in a nozzle plate, forming a first positioning hole in the nozzle plate, forming a second positioning hole in a housing, fitting a positioning member into the first positioning hole and the second positioning hole to position the nozzle plate relative to the housing, and bonding the nozzle plate and the housing to each other to form a single bonded body. The first positioning hole penetrates through the nozzle plate in a thickness direction of the nozzle plate, and the second positioning hole extends in a thickness direction of the housing. A length of the positioning member in the thickness direction of the nozzle plate is smaller than a sum of a length of the first positioning hole and a length of the second positioning hole in the thickness direction of the nozzle plate, and larger than the length of the second positioning hole in the thickness direction of the nozzle plate.

As described above, according to the present disclosure, the nozzle plate can be bonded to the housing in the single bonded body with the positioning member left in place to position the nozzle plate relative to the housing.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A liquid discharge head comprising:

a nozzle plate having:

a nozzle hole from which a liquid is discharged; and a first positioning hole penetrating through the nozzle plate in a thickness direction of the nozzle plate;

a housing bonded to the nozzle plate to form a single bonded body, the housing having a second positioning hole extending in a thickness direction of the housing;

a channel between the nozzle plate and the housing, the liquid flowing through the channel to the nozzle hole; and a positioning member fitting into the first positioning hole and the second positioning hole to position the nozzle plate relative to the housing, wherein a length of the positioning member in the thickness direction of the nozzle plate is:

smaller than a sum of a length of the first positioning hole and a length of the second positioning hole in the thickness direction of the nozzle plate; and larger than the length of the second positioning hole in the thickness direction of the nozzle plate.

2. The liquid discharge head according to claim 1, further comprising a needle valve configured to open and close the nozzle hole, wherein the housing further has a through hole through which the needle valve is slidable, and the nozzle plate and the housing are bonded to each other to form the single bonded body with the through hole and the nozzle hole concentric with each other.

3. The liquid discharge head according to claim 1, wherein the nozzle plate, the housing, and the positioning member are made of stainless steel.

4. The liquid discharge head according to claim 1, wherein the nozzle plate and the housing are directly bonded to each other in the single bonded body.

5. The liquid discharge head according to claim 1, wherein the nozzle plate includes multiple plates laminated one on another.

6. The liquid discharge head according to claim 1, further comprising multiple nozzle holes including the nozzle hole; and multiple first positioning holes including the first positioning hole, wherein the multiple nozzle holes are arranged in a longitudinal direction of the nozzle plate in a row, and the multiple first positioning holes are disposed at both end portions of the row of the multiple nozzle holes in the longitudinal direction.

7. The liquid discharge head according to claim 6, wherein each of the multiple first positioning holes is a round hole.

8. The liquid discharge head according to claim 6, wherein one of the multiple first positioning holes at one of the both end portions in the longitudinal direction is a round hole, and another of the multiple first positioning holes at another of the both end portions in the longitudinal direction is a slotted hole elongated in the longitudinal direction.

9. The liquid discharge head according to claim 1, further comprising:

multiple nozzle holes including the nozzle hole; and multiple first positioning holes including the first positioning hole, wherein the multiple nozzle holes are arranged in a longitudinal direction of the nozzle plate in a row, and the multiple first positioning holes are disposed at:

both end portions of the row of the multiple nozzle holes in the longitudinal direction; and a center portion of the nozzle plate in the longitudinal direction, the center portion shifted from the row in a direction orthogonal to the longitudinal direction.

10. The liquid discharge head according to claim 9, wherein two of the multiple first positioning holes at the both end portions in the longitudinal direction are slotted holes elongated in the longitudinal direction, and one of the multiple first positioning holes at the center portion in the longitudinal direction is a round hole.

11. The liquid discharge head according to claim 1, wherein the positioning member is a pin and is diffusion bonded to the first positioning hole and the second positioning hole.

12. A liquid discharge device comprising:

the liquid discharge head according to claim 1, configured to discharge the liquid to an object.

13. A liquid discharge apparatus comprising:

the liquid discharge device according to claim 12; and a drive mechanism configured to move the liquid discharge device relative to the object.

14. The liquid discharge head according to claim 1, wherein the positioning member is a pin and is implanted in the first positioning hole and the second positioning hole.

15. A method of manufacturing a liquid discharge head comprising:

forming a nozzle hole in a nozzle plate;

forming a first positioning hole in the nozzle plate, the first positioning hole penetrating through the nozzle plate in a thickness direction of the nozzle plate;

forming a second positioning hole in a housing, the second positioning hole extending in a thickness direction of the housing;

fitting a positioning member into the first positioning hole and the second positioning hole to position the nozzle plate relative to the housing; and bonding the nozzle plate and the housing to each other to form a single bonded body, wherein a length of the positioning member in the thickness direction of the nozzle plate is:

smaller than a sum of a length of the first positioning hole and a length of the second positioning hole in the thickness direction of the nozzle plate; and larger than the length of the second positioning hole in the thickness direction of the nozzle plate.

16. The method according to claim 15, wherein the positioning member is a pin and is implanted in the first positioning hole and the second positioning hole.

* * * * *